(12) United States Patent
Chen et al.

(10) Patent No.: US 10,961,259 B2
(45) Date of Patent: Mar. 30, 2021

(54) MULTISTIMULI-RESPONSIVE WHITE LUMINESCENT MATERIALS INCLUDING METAL ELEMENTS

(71) Applicant: Massachusetts Institute of Technology, Cambridge, MA (US)

(72) Inventors: Pangkuan Chen, Brookline, MA (US); Niels Holten-Andersen, Quincy, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 228 days.

(21) Appl. No.: 14/957,577

(22) Filed: Dec. 2, 2015

(65) Prior Publication Data

US 2016/0152638 A1 Jun. 2, 2016

Related U.S. Application Data

(60) Provisional application No. 62/086,230, filed on Dec. 2, 2014.

(51) Int. Cl.
| | |
|---|---|
| *C07F 5/00* | (2006.01) |
| *C09K 9/02* | (2006.01) |
| *C09K 11/06* | (2006.01) |

(52) U.S. Cl.
CPC ............ *C07F 5/003* (2013.01); *C09K 9/02* (2013.01); *C09K 11/06* (2013.01); *C09K 2211/1029* (2013.01); *C09K 2211/182* (2013.01); *Y02B 20/00* (2013.01)

(58) Field of Classification Search
USPC ............ 424/401; 252/300; 473/376, 378
See application file for complete search history.

(56) References Cited

U.S. PATENT DOCUMENTS

| | | | | | |
|---|---|---|---|---|---|
| 7,147,801 | B2* | 12/2006 | Kozee | .............. | B41M 3/144 |
| | | | | | 252/301.16 |
| 7,314,582 | B1* | 1/2008 | Beitz | .............. | G01N 31/222 |
| | | | | | 252/408.1 |
| 7,811,675 | B2* | 10/2010 | Che | .............. | C07D 213/22 |
| | | | | | 252/301.16 |
| 2009/0023518 | A1* | 1/2009 | Lee | .............. | A63B 37/0003 |
| | | | | | 473/376 |
| 2012/0064134 | A1* | 3/2012 | Bourke, Jr. | .............. | A61Q 17/04 |
| | | | | | 424/401 |

OTHER PUBLICATIONS

Notification Concerning Transmittal of International Preliminary Report on Patentability (Chapter I of the Patent Cooperation Treaty) dated Jun. 15, 2017, issued in International Application No. PCT/2015/063553.
Written Opinion of the International Searching Authority dated Feb. 3, 2016, issued in International Application No. PCT/2015/063553.

* cited by examiner

*Primary Examiner* — Monique R Peets
(74) *Attorney, Agent, or Firm* — Honigman LLP

(57) ABSTRACT

Combined lanthanide metal (Ln(III))—coordination complex fluorescence can provide a versatile molecular platform for design of white-light-emitting materials with advanced multistimuli-responsive properties. Red, green and blue light emitting Ln(III) complexes can be combined in solution or in a polymer complex to achieve white luminescent materials responsive to various external stimuli (e.g. solvent polarity, temperature, pH, anion competition and mechanical stimuli).

12 Claims, 46 Drawing Sheets

| Ligand | HOMO | LUMO |
|---|---|---|
| Terpyridine | −6.31 eV | −1.15 eV |
| Methylphenylterpyridine | −6.28 eV | −1.25 eV |
| Chloroterpyridine | −6.57 eV | −1.40 eV |

FIG. 15

MULTISTIMULI-RESPONSIVE WHITE LUMINESCENT MATERIALS INCLUDING METAL ELEMENTS

CLAIM OF PRIORITY

This application claims the benefit of prior U.S. Provisional Application No. 62/086,230 filed on Dec. 2, 2014, which is incorporated by reference in its entirety.

TECHNICAL FIELD

This invention relates to a sensor coating including metal elements.

BACKGROUND

Smart materials, states of matter that possess the capability to undergo reversible changes in response to physical and chemical stimuli from the surrounding environment, have opened new pathways to numerous applications in sensors, drug delivery, and energy storage and conversion. See, R. J. Wojtecki, M. A. Meador, S. J. Rowan, Nat. Mater. 2011, 10, 14; b) C. Weder, Nature 2009, 459, 45, M. A. C. Stuart, W. T. S. Huck, J. Genzer, M. Müller, C. Ober, M. Stamm, G. B. Sukhorukov, I. Szleifer, V. V. Tsukruk, M. Urban, F. Winnik, S. Zauscher, I. Luzinov, S. Minko, Nat. Mater. 2010, 9, 101, I. Grinberg, D. V. West, M. Tones, G. Y. Gou, D. M. Stein, L. Y. Wu, G. N. Chen, E. M. Gallo, A. R. Akbashev, P. K. Davies, J. E. Spanier, A. M. Rappe, Nature 2013, 503, 509, and C. Keplinger, J. Y. Sun, C. C. Foo, P. Rothemund, G. M. Whitesides, Z. G. Suo, Science 2013, 341, 984, each of which is incorporated by reference in its entirety.

SUMMARY

In general, white light emission can be used to assess environmental conditions.

In one aspect, a coating including a composition can include a lanthanide complex, wherein the coating emits white light and undergoes a color change upon exposure to a stimulus. The coating can further include a polymer. In certain embodiments, the polymer can include poly(ethylene glycol). The composition can further comprise a ligand. In certain embodiments, the ligand can include a terpyridine (Tpy).

In certain embodiments, the stimulus can include a solvent, a temperature change, a pH change, anion competition, or a mechanical stimulus.

In certain embodiments, the composition can include europium (Eu). In certain embodiments, the composition can include terbium (Tb). In certain embodiments, the composition can include Eu and Tb and the ratio of Eu:Tb can be 4.96:1.

In certain embodiments, the color change can be reversible.

In another aspect, a coating including a composition can include a lanthanide complex, wherein the coating has a first color and undergoes a color change upon exposure to a stimulus. The coating can further include a polymer. In certain embodiments, the polymer can include poly(ethylene glycol). The composition can further comprise a ligand. In certain embodiments, the ligand can include a terpyridine (Tpy).

In certain embodiments, the stimulus can include a solvent, a temperature change, a pH change, anion competition, or a mechanical stimulus.

In certain embodiments, the composition can include Eu. In certain embodiments, the composition can include Tb. In certain embodiments, the composition can include Eu and Tb.

In certain embodiments, the color change can be reversible.

A composition can include a lanthanide complex, wherein the composition emits white light and undergoes a color change upon exposure to a stimulus. The composition can further include a ligand. In certain embodiments, the ligand can include a Tpy.

In certain embodiments, the stimulus can include a solvent, a temperature change, a pH change, anion competition, or a mechanical stimulus.

In certain embodiments, the composition can include lanthanum (La). In certain embodiments, the composition can include Eu. In certain embodiments, the composition can include Tb. In certain embodiments, the composition can include La, Eu and Tb. In certain embodiments, the ratio of La:Eu:Tb can be 1:1:1.

In certain embodiments, the color change can be reversible.

In certain embodiments, the composition can be incorporated in a polymer gel. In certain embodiments, the polymer gel includes poly(ethylene glycol).

In another aspect, a composition can include a lanthanide complex, wherein the composition has a first color and undergoes a color change upon exposure to a stimulus. The composition can further include a ligand. In certain embodiments, the ligand can include a Tpy.

In certain embodiments, the stimulus can include a solvent, a temperature change, a pH change, anion competition, or a mechanical stimulus.

In certain embodiments, the composition can include lanthanum (La). In certain embodiments, the composition can include Eu. In certain embodiments, the composition can include Tb. In certain embodiments, the composition can include La, Eu and Tb. In certain embodiments, the ratio of La:Eu:Tb can be 1:1:1.

In certain embodiments, the color change can be reversible.

In certain embodiments, the composition can be incorporated in a polymer gel. In certain embodiments, the polymer gel includes poly(ethylene glycol).

In another aspect, a composition can include a lanthanide complex, wherein the composition has a first color and undergoes a color change upon exposure to a stimulus. The composition can further include a ligand. In certain embodiments, the ligand can include a Tpy.

In certain embodiments, the stimulus can include a solvent, a temperature change, a pH change, anion competition, or a mechanical stimulus.

In certain embodiments, the composition can include lanthanum (La). In certain embodiments, the composition can include Eu. In certain embodiments, the composition can include Tb. In certain embodiments, the composition can include La, Eu and Tb.

In certain embodiments, the color change can be reversible.

In certain embodiments, the composition can be incorporated in a polymer gel. In certain embodiments, the polymer gel includes poly(ethylene glycol).

Other aspects, embodiments, and features will be apparent from the following description, the drawings, and the claims.

BRIEF DESCRIPTION OF THE DRAWINGS

FIG. 1A shows photographs under UV lamp ($\lambda_{exc}$=365 nm) showing color changes. FIG. 1B shows overlay of the emission spectra recorded in different solvent compositions.

FIG. 2A shows emission spectra for solutions of Ln(III) ions (equimolar La/Eu/Tb) with terpyridine derivatives under optimized conditions. FIG. 2B shows LUMO orbital plots for the three ligands (B3LYP, 6-31G(d), isovalue=0.2) and their emission photographs for solutions with Ln(III) ions.

FIG. 3A shows photographs showing reversible thermochromism ($\lambda_{exc}$=365 nm): (outer) solution 1 ($H_2O$/DMF=6:4, v/v) at room temperature (RT) and elevated temperature (ET) at 55° C., (inner) solvent evaporated material 1 drop-coated from $H_2O$/acetone on TLC plate and gently heated via heating gun for 7 seconds. FIG. 3B shows emission spectra of 1 in solution ($H_2O$/DMF=6:4, v/v) upon cooling from 80° C. to RT. (Inset) an expansion of green emission band at 545 nm.

FIG. 4A shows photographs of solutions under UV lamp in the pH range of 2-12. FIG. 4B shows 3D overlay of the recorded emission spectra as a function of pH ($\lambda_{exc}$=365 nm).

FIG. 5A shows anion titration of TBAF from THF into 1 in $H_2O$/DMF monitored by fluorescence spectroscopy ([1]$^0$=5.000×10$^{-3}$ M; [F$^-$]$_{stock}$=0.200 M, $\lambda_{exc}$=365 nm), and Job's plot based on the emission changes ($\lambda_{em}$=616 nm) upon the addition of F$^-$. (right: photographs under UV lamp before and after binding with F$^-$ and CN$^-$). FIG. 5B shows proposed changes in Ln(III)—complex coordination for 1 upon addition of F$^-$.

FIG. 9A shows emission spectra of a 3.0×10$^{-5}$ M solution of terpyridine in $H_2O$/DMF (2 mL) upon titration with a solution of EuCl$_3$ in $H_2O$/DMF (c=0.25 mol/L) through a microsyringe. $\lambda_{exc}$=365 nm. FIG. 9B shows Job's plot showing the emission intensity ($\lambda_{em}$=616 nm) at different Ln-Tpy molar ratios.

FIG. 11A shows emission spectra over the full ratio range from 1:9 to 9:1. FIGS. 11B and 11C show same data as in FIG. 11A but emission spectra split into two plots for easier interpretation. Color code is used to indicate different emission bands.

FIG. 13A shows concentration-dependent emission of 1 in $H_2O$/DMF (6:4, v.v). (Inset) photographs of the same samples under UV light ($\lambda_{exc}$=365 nm). Their concentrations from left to right are: 1.0×10$^{-3}$M, 1.5×10$^{-3}$M, 2.0×10$^{-3}$M, 2.5×10$^{-3}$M, 3.0×10$^{-3}$M and 3.5×10$^{-3}$M. FIG. 13B shows emission overlay normalized to the green bands at $\lambda_{em}$=545 nm.

FIG. 14A shows non-substituted terpyridine ($H_2O$/DMF, 6:4, v/v). FIG. 14B shows methylphenyl substituted terpyridine ($H_2O$/DMF, 4:6, v/v). FIG. 14C shows chloroterpyridine ($H_2O$/DMF, 2:8, v/v) under UV light ($\lambda_{exc}$=365 nm).

FIG. 15 shows computed HOMO and LUMO orbital plots for the three ligands with different substituents (B3LYP, 6-31G(d), isovalue=0.2).

FIG. 19A shows schematic preparation of Ln(III) coordination-based luminescent metallogels under UV light ($\lambda_{ex}$=365 nm, 3.5 wt % polymer 1, DMF/CH$_3$CN=1:1 (v:v)). FIG. 19B shows chemical structure of polymer 1 crosslinked via Ln-Terpy metal-coordination.

FIG. 20A shows selected photographs of Ln(III)-based metallogels under UV. FIG. 20B shows emission spectra ($\lambda_{ex}$=345 nm) of metallogels. FIG. 20C shows job's plot of the green/red (G/R) emission intensity ratio as a function of the Tb/Eu molar ratio (1:1, 3:1, 5:1, 7:1, 9:1, 15:1, 19:1 and 96:4).

FIG. 21A shows pH-triggered vapochromism and fluoride anion induced chemochromism. FIG. 21B shows sonication-induced mechanochromism. FIG. 21C shows emission spectra of WLGel, "free" polymer 1 in solution and fluids generated after gel-sol transition (FVA, FVB, FFA and FUS) upon various stimuli. All photographs were taken under UV lamp ($\lambda_{ex}$=365 nm).

FIG. 22A shows luminescent dip coatings from polymer 1 solutions with Eu (letter M), Tb (letter T) and Eu/Tb at 4:96 (letter I) on nonfluorescent neutral silica matrix on TLC plate and pH-responsive color changes of white letter "I"; thermochromism (FIG. 22B) and vapochromism (FIG. 22C) of solvent-evaporated white light emitting metallopolymer films. All photographs were taken under UV lamp ($\lambda_{ex}$=365 nm).

FIG. 25A shows photographs of the luminescence tunable metallogels. FIG. 25B shows Job's plot showing the peak emission intensity of the red and green bands as a function of Tb/Eu molar ratio.

FIGS. 26A-26C show photographs under UV light. FIG. 26D shows emission spectra ($\lambda_{ex}$=345 nm). FIG. 26E shows CIE (Commission International de L'Eclairage) coordinates shift of the WLGel and RLGel upon sonication. FUS=fluid induced by ultrasonication.

DETAILED DESCRIPTION

Figure 1A:
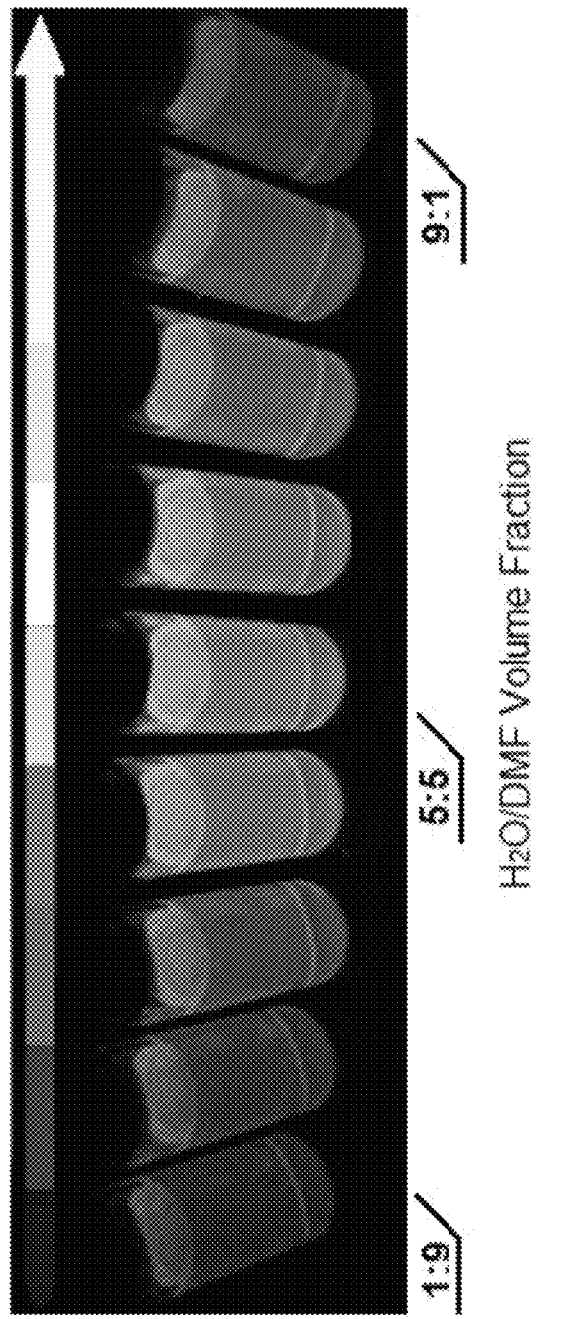
FIGS. 1A-1B show water modulated luminescence of 1 (c=2.00×10$^{-3}$M) as a function of H$_2$O/DMF ratios.
Figure 1B:
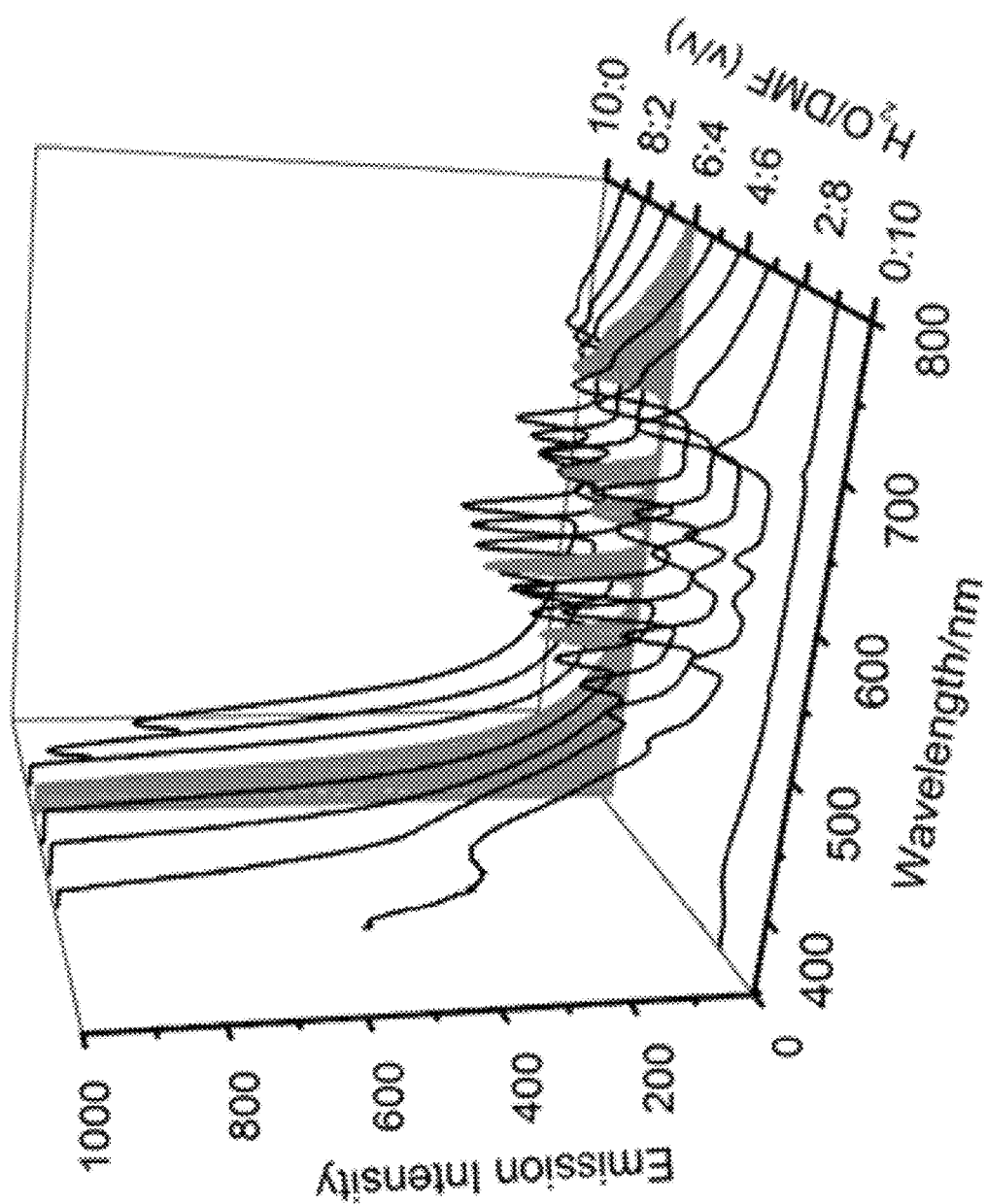

The design of the smart materials often relies on the incorporation of dynamic molecular bonds that as a result of stimuli-induced reversible breaking and reformation provides the responsive behavior. Dynamic bonds investigated include covalent adaptive bonds (see, F. D. Jochum, P. Theato, *Chem. Soc. Rev.* 2013, 42, 7468, and Y. H. Jin, C. Yu, R. J. Denman, W. Zhang, *Chem. Soc. Rev.* 2013, 42, 6634, each of which is incorporated by reference in its entirety) and supramolecular noncovalent bonds (e.g., H-bonding, %-% stacking, hydrophobic, and host-guest complexation) (see L. Zhai, *Chem. Soc. Rev.* 2013, 42, 7148, which is incorporated by reference in its entirety) and more recently stimuli-responsive mechanisms via metal-coordination have been explored in polymeric materials. See, G. R. Whittell, M. D. Hager, U. S. Schubert, I. Manners, *Nat. Mater.* 2011, 10, 176, which is incorporated by reference in its entirety. Metal-coordination bonds offer particularly attractive dynamic properties for smart materials design since their complex hybrid covalent-electrostatic nature provides unique environmental triggers and intermediate bond strength for expanded control of bond cleavage and ligation. See, M. Chiper, R. Hoogenboom, U. S. Schubert, *Macromol. Rapid Commun.* 2009, 30, 565, which is incorporated by reference in its entirety. Pioneering work by Weder and co-workers reported optically self-healing supramolecular metallopolymers based on lanthanide metal-ligand bonding (M. Burnworth, L. M. Tang, J. R. Kumpfer, A. J. Duncan, F. L. Beyer, G. L. Fiore, S. J. Rowan, C. Weder, *Nature* 2011, 472, 334, which is incorporated by reference in its entirety), and bio-inspired materials functionalized with transition metal-(poly)phenolic ligands have recently emerged in various bulk thin film and surface applications. See, N. Holten-Andersen, M. J. Harrington, H. Birkedal, B. P. Lee, P. B. Messersmith, K. Y. C. Lee, J. Herbert Waite, *PNAS* 2011, 108, 2651, H. Ejima, J. J. Richardson, K. Liang, J. P. Best, M. P. Van Koeverden, G. K. Such, J. W. Cui, F. Caruso, *Science* 2013, 341, 154, and H. Lee, S. M. Dellatore, W. M. Miller, P. B. Messersmith, *Science* 2007, 318, 426, each of which is incorporated by reference in its entirety.

Compared with the 3D transition metal coordination compounds, one of the unique characteristics of lanthanide-based analogues is their metal-centered photoluminescent properties. Robust luminescence of these complexes predominantly stems from Ln(III) metal sources in the presence of UV-light-absorbing functional groups serving as organic sensitizers through the so-called "antenna effect" (see, K. A. Gschneidner Jr., J.-C. G. Bünzli, V. Pecharsky, Eds., Handbook on the Physics and Chemistry of Rare Earths. Elsevier Science, Amsterdam, Netherlands 2009, G. F. de Sá, O. L. Malta, C. de M. Donegá, A. M. Simas, R. L. Longo, P. A. Santa-Cruz, E. F. da S. Jr. *Coord. Chem. Rev.* 2000, 196, 165, J. G. Bünzli, C. Piguet, *Chem. Soc. Rev.* 2005, 34, 1048, K. Binnemans, *Chem. Rev.* 2009, 109, 4283, L. Xu, G. Xu, Z. Chen, *Coord. Chem. Rev.* 2014, 273273-274, 47, Y. Cui, B. Chen, G. Qian, *Coord. Chem. Rev.* 2014, 273-274, 76, and S. J. Bradberry, A. J. Savyasachi, M. Martinez-Calvo, T. Gunnlaugsson, *Coord. Chem. Rev.* 2014, 273-274, 226, each of which is incorporated by reference in its entirety), a mechanism already utilized in optical sensing applications in medicine and electroluminescent devices in electronics. See, R. Martínez-Máñez, F. Sancenón, *Chem. Rev.* 2003, 103, 4419; b) J. S. Kim, D. T. Quang, *Chem. Rev.* 2007, 107, 3780, each of which is incorporated by reference in its entirety. However, with expanding tunable optical applications, multicolor white light-emitting materials are in growing demand since in comparison to monochromic emission multichromic white light emission will enable more sensitive multistimuli responsive materials. See, H. Wu, L. Ying, W. Yang, Y. Cao, *Chem. Soc. Rev.* 2009, 38, 3391, G. M. Farinola, R. Ragni, *Chem. Soc. Rev.* 2011, 40, 3467, V. K. Praveen, C. Ranjith, N. Armaroli, *Angew. Chem. Int. Ed.* 2014, 53, 365, and references therein, M. D. Ward, *Chem. Soc. Rev.* 1997, 26, 365, and J. Y. Tsao, M. H. Crawford, M. E. Coltrin, A. J. Fischer, D. D. Koleske, G. S. Subramania, G. T. Wang, J. J. Wierer, R. F. Karlicek Jr, *Adv. Optical Mater.* 2014, 2, 809, each of which is incorporated by reference in its entirety. Despite a variety of research efforts in organic-based materials (see, Q. Y. Yang, J. M. Lehn, *Angew. Chem. Int. Ed.* 2014, 53, 4572, and references therein, S. Y. Lee, T. Yasuda, Y. S. Yang, Q. S. Zhang, C. Adachi, *Angew. Chem. Int. Ed.* 2014, 53, 6402, M. Mazzeo, V. Vitale, F. D. Sala. M. Anni, G. Barbarella, L. Favaretto, G. Sotgiu, R. Cingolani, G. Gigli, *Adv. Mater.* 2005, 17, 34, and Y. S. Zhao, H. B. Fu, F. Q. Hu, A. D. Peng, W. S. Yang, J. N. Yao, *Adv. Mater.* 2008, 20, 79, each of which is incorporated by reference in its entirety), copolymerbased metal-supported compounds and metal complexes in the solid, solution, and gel state, examples of stimuliresponsive white luminescent materials are still few. See, R. Shunmugam, G. N. Tew, *Polym. Adv. Technol.* 2008, 19, 596, F. I. Wu, X. H. Yang, D. Neher, R. Dodda, Y. H. Tseng, C. F. Shu, *Adv. Funct. Mater.* 2007, 17, 1085, H. F. Gao, D. A. Poulsen, B. W. Ma, D. A. Unruh, X. Y. Zhao, J. E. Millstone, J. M. J. Fréchet, *Nano Lett.* 2010, 10, 1440, E. R. Dohner, E. T. Hoke, H. I. Karunadasa, *J. Am. Chem. Soc.* 2014, 136, 1718, C. Y. Sun, X. L. Wang, X. Zhang, C. Qin, P. Li, Z. M. Su, D. X. Zhu, G. G. Shan, K. Z. Shao, H. Wu, J. Li, *Nat. Commun.* 2013, 4, 1, Q. Tang, S. X. Liu, Y. W. Liu, D. F. He, J. Miao, X. Q. Wang, Y. J. Ji, Z. P. Zheng, *Inorg. Chem.* 2014, 53, 289, M. Roushan, X. Zhang, J. Li, *Angew. Chem. Int. Ed.* 2012, 51, 436, H. J. Bolink, F. D. Angelis, E. Baranoff, C. Klein, S. Fantacci, E. Coronado, M. Sessolo, K. Kalyanasundaram, M. Grätzel, M. K. Nazeeruddin, *Chem. Common.* 2009, 45, 4672, H. B. Xu, X. M. Chen, Q. S. Zhang, L. Y. Zhang, Z. N. Chen, *Chem. Common.* 2009, 45, 7318, A. C. Wibowo, S. A. Vaughn, M. D. Smith, H. C. Loye, *Inorg. Chem.* 2010, 49, 11001, S. Sivakumar, F. C. J. M. Veggel, M. Raudsepp, *J. Am. Chem. Soc.* 2005, 127, 12464, E. R. Dohner, A. Jaffe, L. R. Bradshaw, H. I. Karunadasa, *J. Am. Chem. Soc.* 2014, 136, 13154, M. S. Wang, S. P. Guo, Y. Li, L. Z. Cai, J. P. Zou, G. Xu, W. W. Zhou, F. K. Zheng, G. C. Guo, *J. Am. Chem. Soc.* 2009, 131, 13572, Y. Liu, M. Pan, Q. Y. Yang, L. Fu, K. Li, S. C. Wei, C. Y. Su, *Chem. Mater.* 2012, 24, 1954; 1) D. F. S. Gallis, L. E. S. Rohwer, M. A. Rodriguez, T. M. Nenoff, *Chem. Mater.* 2014, 26, 2943, D. F. Sava, L. E. S. Rohwer, M. A. Rodriguez, T. M. Nenoff, *J. Am. Chem. Soc.* 2012, 134, 3983, S. Dang, J. H. Zhang, Z. M. Sun, *J. Mater. Chem.* 2012, 22, 8868, Y. Wei, Q. Li, R. Sa, K. Wu, *Chem. Commun.* 2014, 50, 1820, J. He, M. Zeller, A. D. Hunter, Z. Xu, *J. Am. Chem. Soc.* 2012, 134, 1553, G. J. He, D. Guo, C. He, X. L. Zhang, X. W. Zhao, C. Y. Duan, *Angew. Chem. Int. Ed.* 2009, 48, 6132, D. Sykes, I. S. Tidmarsh, A. Barbieri, I. V. Sazanovich, J. A. Weinstein, M. D. Ward, Inorg. Chem. 2011, 50, 11323, A. H. Shelton, I. V. Sazanovich, J. A. Weinstein, M. D. Ward, Chem. Commun. 2012, 48, 2749, P. Coppo, M. Duati, V. N. Kozhevnikov, J. W. Hofstraat, L. D. Cola, Angew. Chem. Int. Ed. 2005, 44, 1806, Y. C. Liao, C. H. Lin, S. L. Wang, J. Am. Chem. Soc. 2005, 127, 9986, M Han, Y. Tian, Z. Yuan, L. Zhu, B. Ma, Angew. Chem. Int. Ed. 2014, 53, 10908, X. Zhang, W. Liu, G. Z. Wei, D. Banerjee, Z. Hu, J. Li, J. Am. Chem. Soc. 2014, 136, 14230, and H. Kim, J. Y. Chang, RSC Adv. 2013, 3, 1774, each of which is incorporated by reference in its entirety.

Dynamic metal-ligand (M-L) coordination has recently emerged as a powerful strategy in the design of various types of stimuli-responsive materials properties. This development parallels the pursuit of purely organic-based stimuli-responsive mechanism that commonly utilizes either reversible covalent chemistry or supramolecular interactions. See, Intelligent Stimuli-responsive Materials (Ed: Li, Q.), John Wiley & Sons, Inc., Hoboken, N.J., USA 2013. For journal reviews, see Wojtecki, R. J.; Meador, M. A.; Rowan, S. J. Nat. Mater. 2011, 10, 14, Whitten, G. R.; Hager, M. D.; Schubert, U. S.; Manners, I. Nat. Mater. 2011, 10, 176, Weiss, R. G. J. Am. Chem. Soc. 2014, 136, 7519, Tam, A. Y.; Yam, V. W. Chem. Soc. Rev. 2013, 42, 1540, Yu, X.; Chen, L.; Zhang, M.; Yi, T. Chem. Soc. Rev. 2014, 43, 5346, Fiore, G. L.; Rowan, S. J.; Weder, C. Chem. Soc. Rev. 2013, 42, 7278, Buerkle, L. E.; Rowan, S. J. Chem. Soc. Rev. 2012, 41, 6089, Qi, Z.; Schalley, C. A. Acc. Chem. Res. 2014, 47, 2222, Harada, A.; Takashima, Y.; Nakahata, M. Acc. Chem. Res. 2014, 47, 2128, Jochum, F. D.; Theato, P. Chem. Soc. Rev. 2013, 42, 7468, Wei, P.; Yan, X.; Huang, F. Chem. Soc. Rev. 2015, 44, 815, and Wang, H.; Heilshorn, S. C. Adv. Mater. 2015, 27, 3717, each of which is incorporated by reference in its entirety. In the particular subset of stimuli-responsive properties labeled self-healing, several M-L systems have been reported to demonstrate remarkable self-healing response after various types of damage stimuli. See, Lifschitz, A. M.; Rosen, M. S.; McGuirk, C. M.; Mirkin, C. A. J. Am. Chem. Soc. 2015, 137, 7252, Burnworth, M.; Tang, L.; Kumpfer, J. R.; Duncan, A. J.; Beyer, F. L.; Fiore, G. L.; Rowan, S. J.; Weder, C. Nature 2011, 472, 334, Holten-Andersen, N.; Harrington, M. J.; Birkedal, H.; Lee, B. P.; Messersmith, P. B.; Lee, K. Y. C.; Waite, J. H. PNAS 2011, 108, 2651, Bode, S.; Zedler, L.; Schacher, F. H.; Dietzek, B.; Schmitt, M.; Popp, J.; Hager, M. D.; Schubert, U. S. Adv. Mater. 2013, 25, 1634, Mozhdehi, D.; Ayala, S.; Cromwell, O. R.; Guan, Z. J. Am. Chem. Soc. 2014, 136, 16128, Balkenende, D. W. R.; Coulibaly, S.; Balog, S.; Simon, Y. C.; Fiore, G. L.; Weder, C. J. Am. Chem. Soc. 2014, 136, 10493, and Martinez-Calvo, M.; Kotova, O.; Mobius, M. E.; Bell, A. P.; McCabe, T.; Boland, J. J.; Gunnlaugsson, T. J. Am. Chem. Soc. 2015, 137, 1983, each of which is incorporated by reference in its entirety. In addition to self-healing, self-reporting damage-detection is a rapidly growing research area in which mechanophore-based strategies and luminescent materials are explored in potential applications where color changes in response to various stimuli are of particular interest. See, Ball Milling Towards Green Synthesis: Applications, Projects, Challenges (Eds.: Ranu, B.; Stolle, A.), RSC, London, 2015. For reviews, see: Boldyreva, E. Chem. Soc. Rev. 2013, 42, 7719, Braga, D.; Maini, L.; Grepioni, F. Chem. Soc. Rev. 2013, 42, 7638, James, S. L.; Friscic, T. Chem. Soc. Rev. 2013, 42, 7494, James, S. L.; Adams, C. J.; Bolm, C.; Braga, D.; Collier, P.; Friscic, T.; Grepioni, F.; Harris, K. D. M.; Hyett, G.; Jones, W.; Krebs, A.; Mack, J.; Maini, L.; Orpen, A. G.; Parkin, I. P.; Shearouse, W. C.; Steed, J. W.; Waddell, D. C. Chem. Soc. Rev. 2012, 41, 413, Schutze, D.; Holz, K.; Muller, J.; Beyer, M. K.; Luning, U.; Hartke, B. Angew. Chem. Int. Ed. 2015, 54, 2556, Batzdorf, L.; Fischer, F.; Wilke, M.; Wenzel, K.; Emmerling, F. Angew. Chem. Int. Ed. 2015, 54, 1799, Larsen, M. B.; Boydston, A. J. J. Am. Chem. Soc. 2014, 136, 1276, Diesendruck, C. E.; Peterson, G. I.; Kulik, H. J.; Kaitz, J. A.; Mar, B. D.; May, P. A.; White, S. R.; Martinez, T. J.; Boydston, A. J.; Moore, J. S. Nat. Chem. 2014, 6, 623, Wang, J.; Kouznetsova, T. B.; Niu, Z.; Ong, M. T.; Klukovich, H. M.; Rheingold, A. L.; Martinez, T. J.; Craig, S. L. Nat. Chem. 2015, 7, 323, Chan, E. P.; Walish, J. J.; Urbas, A. M.; Thomas, E. L. Adv. Mater. 2013, 25, 3934, Polman, A.; van Veggel, F. C. J. M. J. Opt. Soc. Am. B 2004, 21, 871, Eliseeva, S. V.; Bunzli, J.-C. Chem. Soc. Rev. 2010, 39, 189, Ciardelli, F.; Ruggeri, G.; Pucci, A. Chem. Soc. Rev. 2013, 42, 857 and Yan, X.; Cook, T. R.; Wang, P.; Huang, F.; Stang, P. J. Nat. Chem. 2015, 7, 342, each of which is incorporated by reference in its entirety. These and other efforts in stimuli-responsive materials design promise to improve the overall performance, safety, lifetime and environmental sustainability of a variety of materials in the future. See, McConnell, A. J.; Wood, C. S.; Neelakandan, P. P.; Nitschke, J. R. Chem. Rev. 2015, 115, 7729, Balch, A. L. Angew. Chem. Int. Ed. 2009, 48, 2641, Wei, S.; Pan, M.; Li, K.; Wang, S.; Zhang, J.; Su, C. Adv. Mater. 2014, 26, 2072, Suhina, T.; Weber, B.; Carpentier, C. E.; Lorincz, K.; Schall, P.; Bonn, D.; Brouwer, A. M. Angew. Chem. Int. Ed. 2015, 54, 3688, Sun, X.; Zhang, J.; Lu, X.; Fang, X.; Peng, H. Angew. Chem. Int. Ed. 2015, 54, 3630, Wang, L.; Wang, K.; Zou, B.; Ye, K.; Zhang, H.; Wang, Y. Adv. Mater. 2015, 27, 2918, Benito, Q.; Goff, X. F. L.; Maron, S.; Fargues, A.; Garcia, A.; Martineau, C.; Taulelle, F.; Kahlal, S.; Gacoin, T.; Boilot, J.; Perruchas, S. J. Am. Chem. Soc. 2014, 136, 11311, and Sun, Z.; Lv, F.; Cao, L.; Liu, L.; Zhang, Y.; Lu, Z. Angew. Chem. Int. Ed. 2015, 54, 7944, each of which is incorporated by reference in its entirety.

Disclosed herein is a simple yet versatile molecular platform using combined lanthanide metal-coordination complex fluorescence for design of white-light-emitting materials with advanced multistimuli-responsive properties.

A composition red, green and blue light emitting lanthanide (Ln(III)) metal complexes can be combined in solution or in a polymer complex. In certain embodiments, the polymer complex can be hydrogel, polymer gel, or solvent-free polymer melts. The resulting white luminescent materials are responsive to a series of external stimuli (e.g. solvent polarity, temperature, pH, anion competition and mechanical stimuli). This simple Red-Green-Blue (RGB) molecular chromophore approach to white light emitting molecular systems indeed affords materials with superior thermo-mechano-chemical stimuli-response properties.

As used herein, the term "hydrogel" or "polymer gel" is given its ordinary meaning in the art and refers to a material comprising a polymer network that is able to trap and contain water. The hydrogel may include polymer chains that are crosslinked, either directly or via a crosslinking agent. The degree of crosslinking may be varied, in some cases, to tailor the extent to which the gel absorbs or retains fluids. Examples of polymers capable of forming hydrogels include, but are not limited to, collagen, silicon-containing polymers, polyacrylamides, crosslinked polymers (e.g., polyethylene oxide, polyAMPS and polyvinylpyrrolidone), polyvinyl alcohol, acrylate polymers (e.g., sodium polyacrylate), or copolymers with an abundance of hydrophilic groups.

The hydrogel can be a porous structure. The pore sizes in the porous structure can be determined by factors including the concentration of polymers and crosslinks in the hydrogel. A hydrogel having a desired pore size or desired pore size distribution can be prepared by selecting the concentrations of monomers and crosslinkers present during polymerization to form a hydrogel. It can be advantageous for the hydrogel pores to be large enough to permit free access of analytes to components embedded in the hydrogel, e.g., to photoluminescent nanostructures. The pore size can be in the range of, for example, 10 nm to 1,000 nm, 20 nm to 500 nm, 50 nm to 250 nm, or 10 nm to 100 nm. When the analyte is a macromolecule (e.g., a protein, such as an immunoglobulin), a pore size greater than 10 nm, greater than 20 nm, greater than 30 nm, greater than 40 nm, greater than 50 nm, greater than 60 nm, greater than 70 nm, greater than 80 nm, greater than 90 nm, or 100 nm or greater can be desireable.

A polymer can be biocompatible, which can mean that the polymer is well tolerated by an organism. More specifically, biocompatibility can mean that a polymer does not elicit an immune response when it is brought in contact with an organism. It can also mean that a polymer can integrate into cell structures, cells, tissues or organs of an organism. The organism can be mammal, in particular, a human.

In certain embodiments, the composition can include a lanthanide complex including one or more of lanthanide metals, such as lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or any combinations thereof.

In certain embodiments, the lanthanide metals can be in an ionic state. In certain other embodiments, the lanthanide metals can in an elemental state. In certain embodiments, lanthanide particles can be in the nano- to macro-scopic size scales (i.e. 5 nm to 10 mm). See, for example, DOI: 10.1007/4243_2010_11, which is incorporated by reference in its entirety. In certain embodiments, the composition can include lanthanum La, Eu and Tb. Various ratios of La, Eu and Tb can be included in the composition to generate a desired color. In certain embodiments, the composition can include lanthanum Eu and Tb. Various ratios of Eu and Tb can be included in the composition to generate a desired color. The resulting color of the composition also depends on characteristics of the solvent or the polymer complex wherein the composition is incorporated.

In certain embodiments, the composition can be dissolved in $H_2O$ or in various organic solvents, such as DMF, THF, and acetone, or any combinations thereof. In certain embodiments, the composition can be incorporated in a polymer complex, forming a hydrogel or a metallogel. In certain embodiments, the polymer complex can be solvent-free polymer melts. In certain embodiments, the polymer can include poly(ethylene glycol). In certain embodiments, the polymer complex can be tetraphenylethylene-based or block-copolymer-based scaffolds.

The composition can be a first color and the color of the composition can change upon exposure to an external stimulus. In certain embodiments, the first color can be white luminescence. The color change can be reversible, i.e. the removal of the stimulus can reverse the color of the composition to the first color.

The composition can include a ligand. In certain embodiments, the ligand can include non-substituted terpyridine (Tpy), or substituted Tpy, such as methylphenylterpyridine, or chloroterpyridine. In certain embodiments, the ligand can be other N-based moieties, such as imidazole, triazole, pyrazine, triazine and pyridylcarboxylate.

First, disclosed herein is a proof of concept design strategy for model luminescent fluid systems based on the dynamic nature of lanthanide metal-coordinate complexes (Ln=La/Eu/Tb). By mixing lanthanide metal ions in equimolar ratios with selected 2,2':6',2"-terpyridine (Tpy) derivatives (1) in aqueous/organic solvents, we generate solutions with intense white light emission under UV irradiation and demonstrate their response to a diverse array of chemical and physical stimuli including solvent composition, pH, anion competition, temperature and ultrasound. This technically simple demonstration of chemo-, thermo- and mechanochromic supramolecular white light emission suggests advanced applications for smart fluid systems and provides new opportunities to further develop metal coordination-based smart materials.

Figure 7:
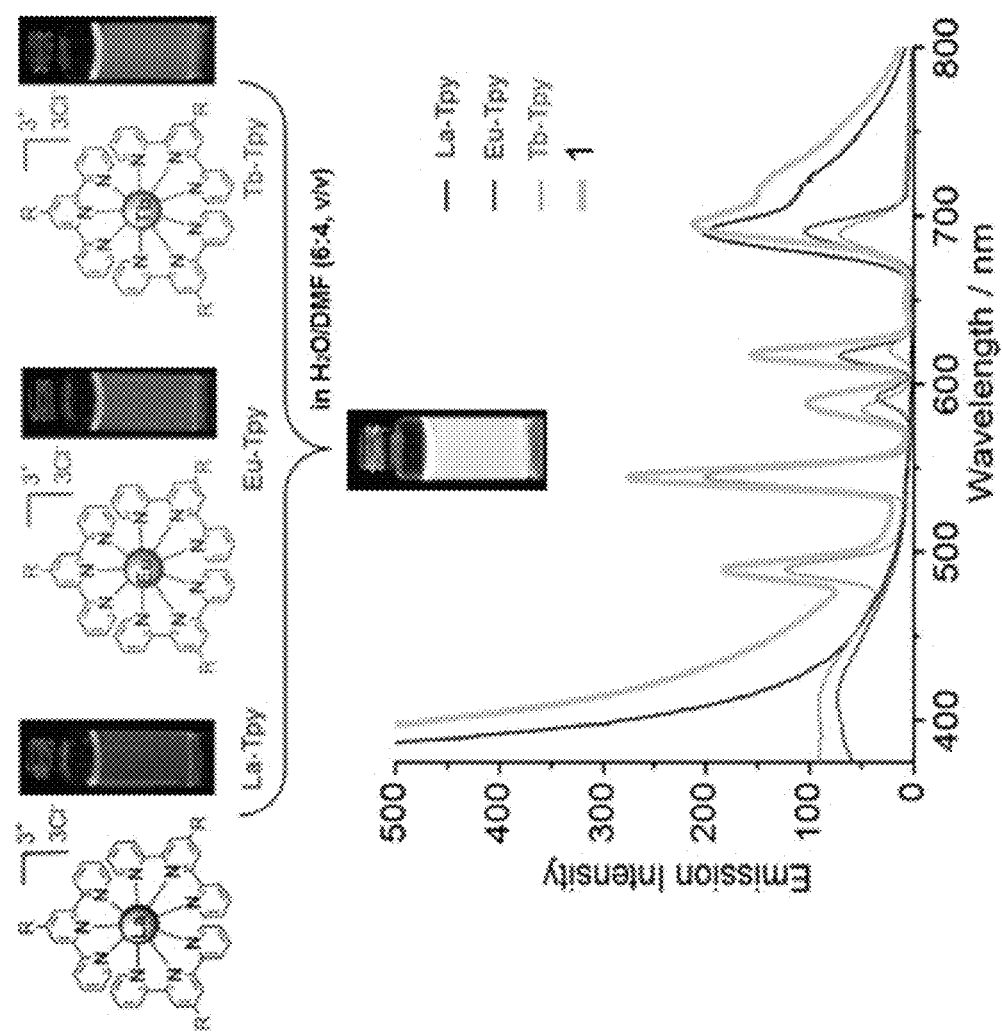
FIG. 7 shows a schematic for hybrid material 1 (La$^{3+}$:Eu$^{3+}$:Tb$^{3+}$:Tpy in 1:1:1:9 molar ratio).
Figure 8:
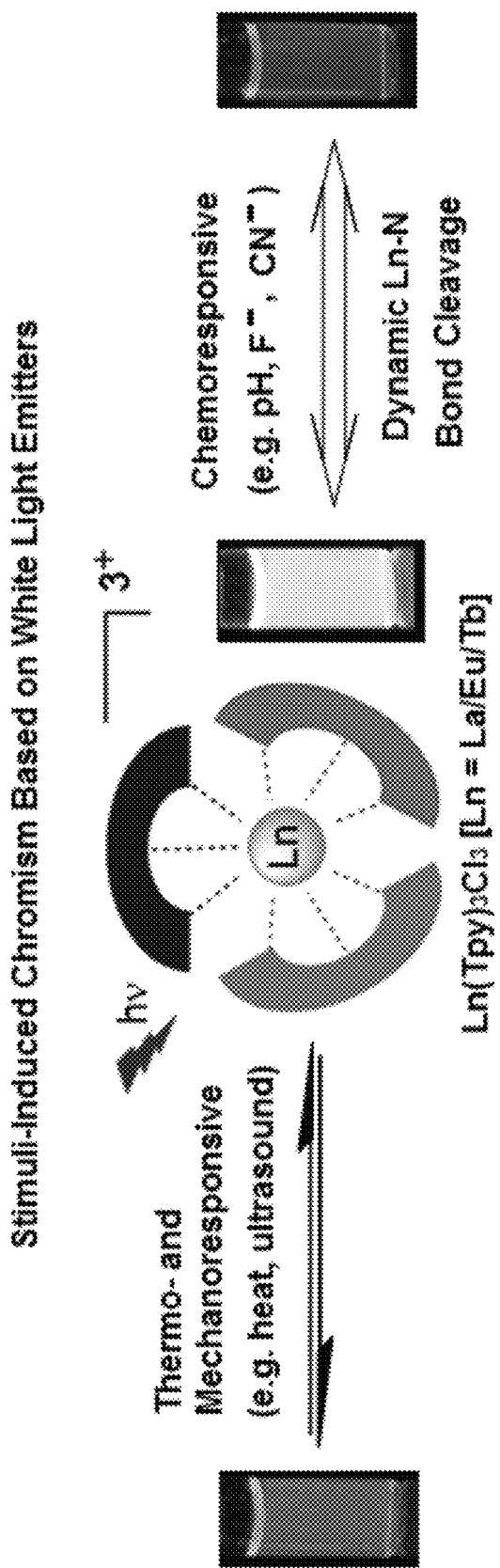
FIG. 8 shows a schematic of stimuli-induced chromisn based on white light emitters.

Intense white luminescence in aqueous solution is achieved via coordination of mixed lanthanide ions with non-substituted 2,2':6',2"-terpyridine. Chromic properties of the lanthanide hybrid molecular solutions are highly responsive to stimuli, such as changes in solvent composition, pH, temperature, anion binding and mechanical force due to the dynamic Ln(III) coordination bonds (FIG. 7). FIG. 7 shows a model molecular platform for white-light emission (solvent: $H_2O/DMF=6:4$, v/v). Photographs upon UV irradiation ($\lambda_{exc}=365$ nm) and recorded emission spectra (c=5.00× $10^{-3}$ M; R=H).

Secondly, design strategy for model luminescent polymer gel system was demonstrated by model light-emitting metallogels functionalized with lanthanide metal-ligand (M-L) coordination complexes via a terpyridyl end-capped 4-Arm-PEG polymer. The optical properties of these highly luminescent polymer networks are readily modulated over a wide spectrum including white light emission by simply tuning lanthanide metal ion stoichiometry. Furthermore, the dynamic nature of the Ln-N coordination bonding leads to a broad variety of reversible stimuli-responsive properties (mechano-, vapo-, thermo- and chemochromism) of both sol-gel systems and solid thin films. The versatile functional performance combined with the ease of assembly suggests that this lanthanide coordination polymer design approach offers a robust pathway for future engineering of multi-stimuli responsive polymer materials.

Embodiments in Solution

Figure 6:
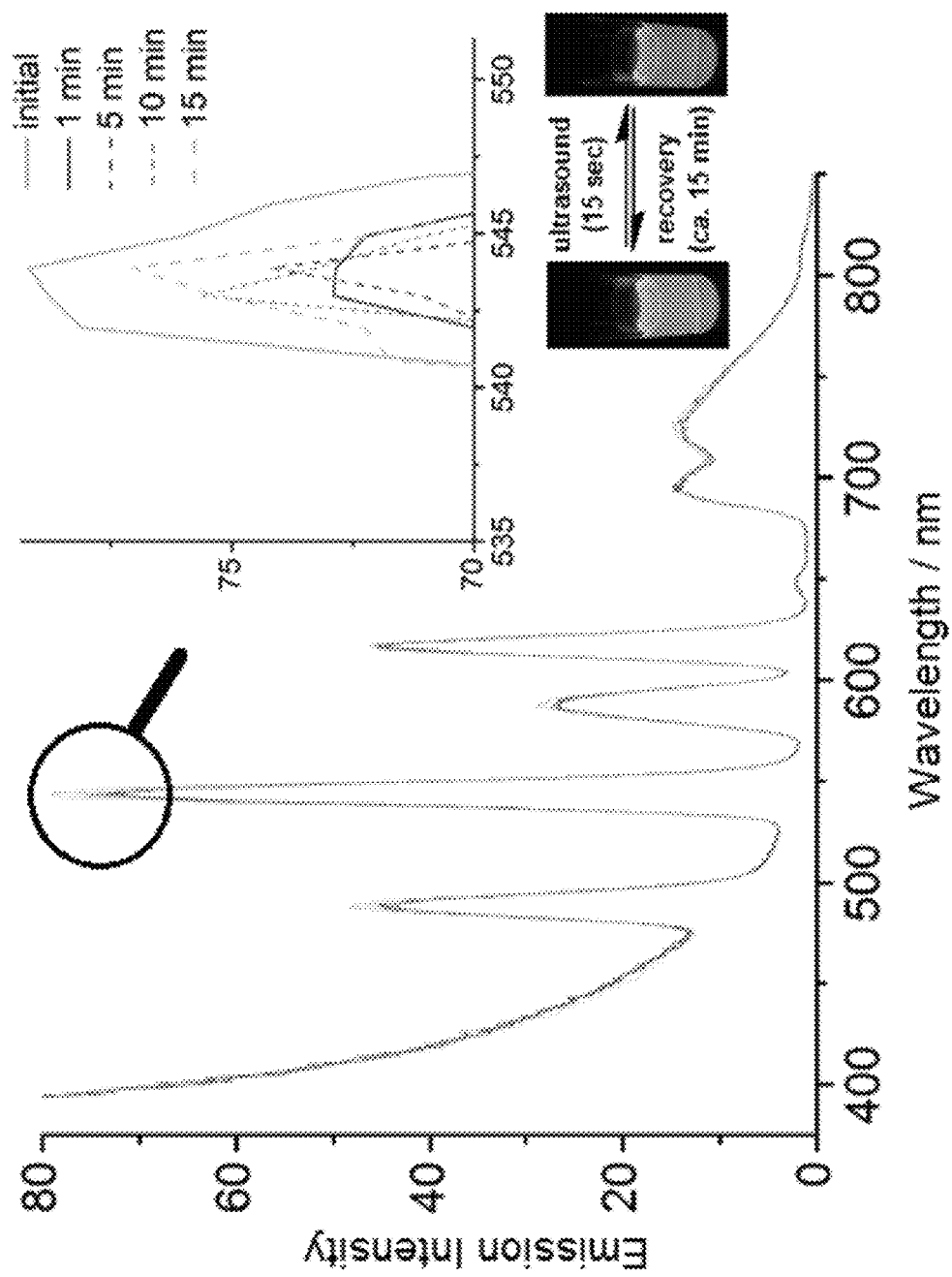
FIG. 6 shows mechanochromic study of 1 via emission spectroscopy upon ultrasound. (Inset) photographs of the samples before and immediately after sonication ($\lambda_{exc}$=365 nm), and an expanded view of the green emissive band at 545 nm during recovery.
Figure 9B:
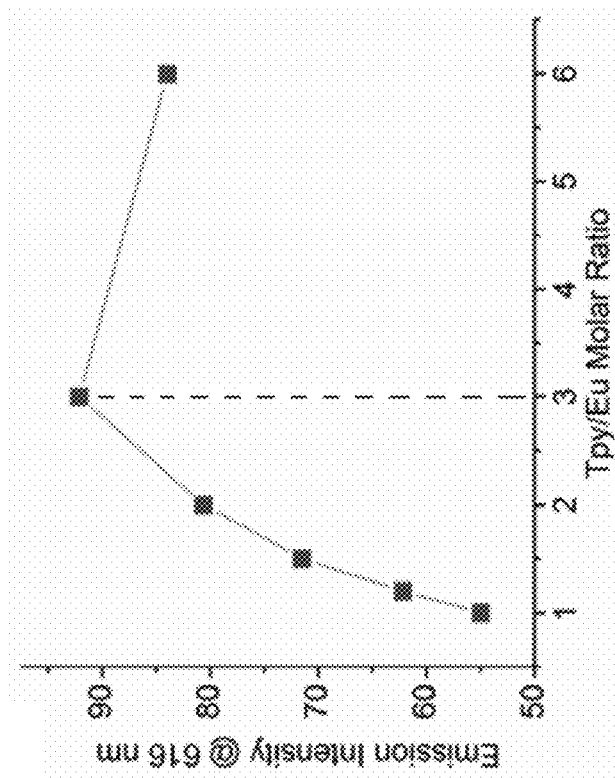
FIGS. 9A-9B show metal-ligand molar ratio study.
Figure 9A:
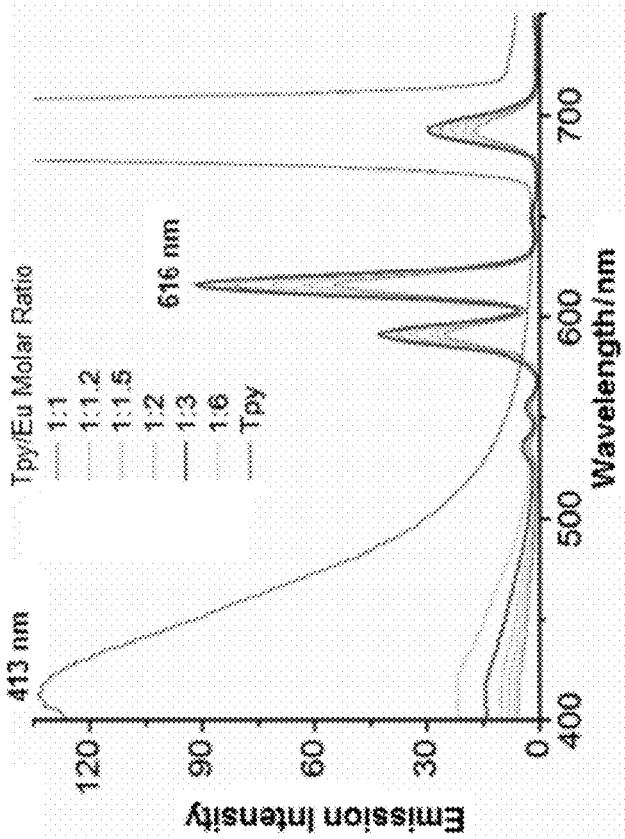
Figure 10:
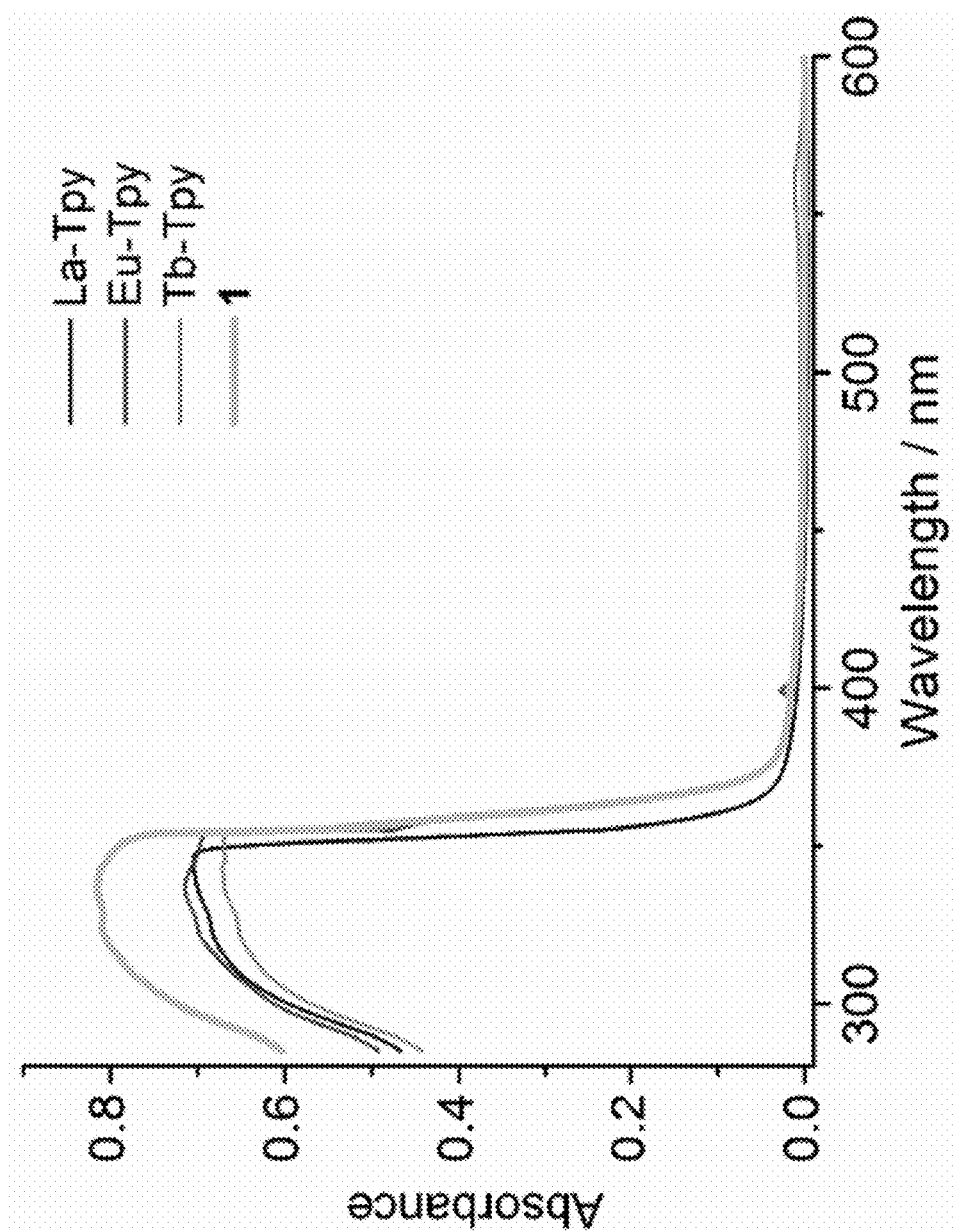
FIG. 10 shows UV absorption spectra of Ln-Tpy complexes in $H_2O$/DMF (6:4, v.v) at room temperature.
Figure 11A:
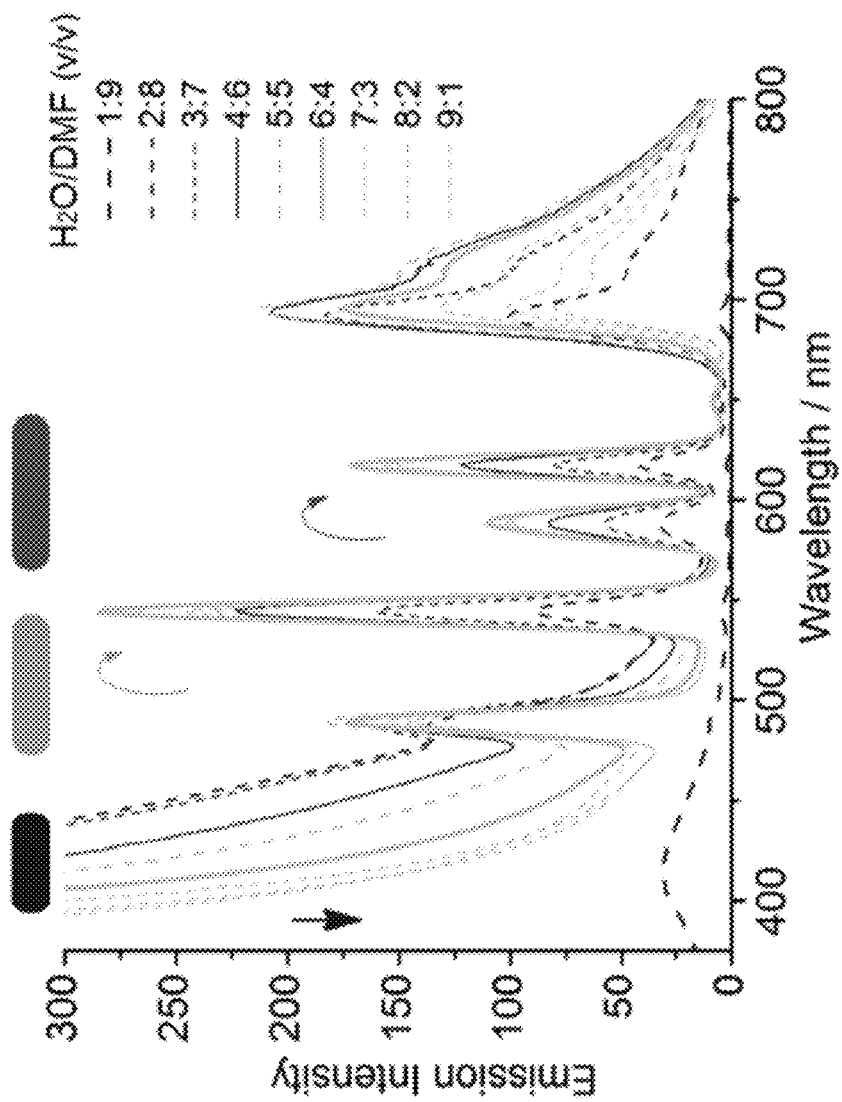
FIGS. 11A-11C show water modulated luminescence of 1 (c=2.00×10$^{-3}$ M) as a function of changing of $H_2O$/DMF ratios.
Figure 11B:
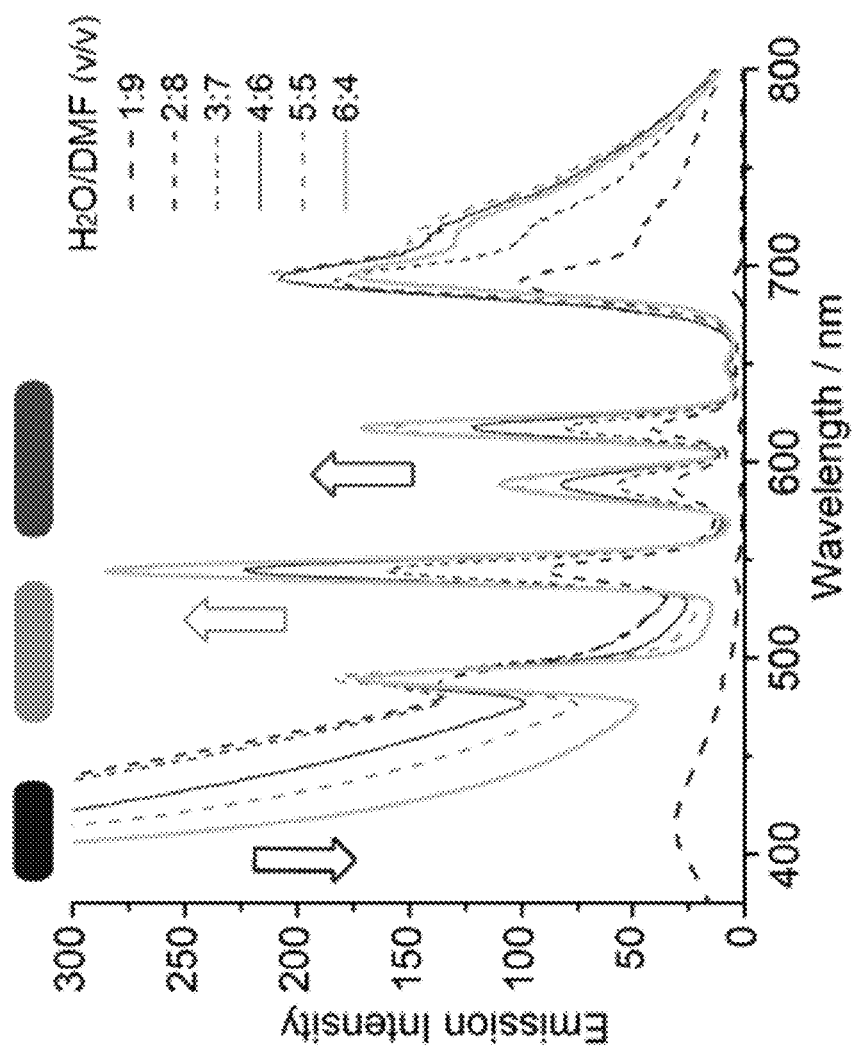
Figure 11C:
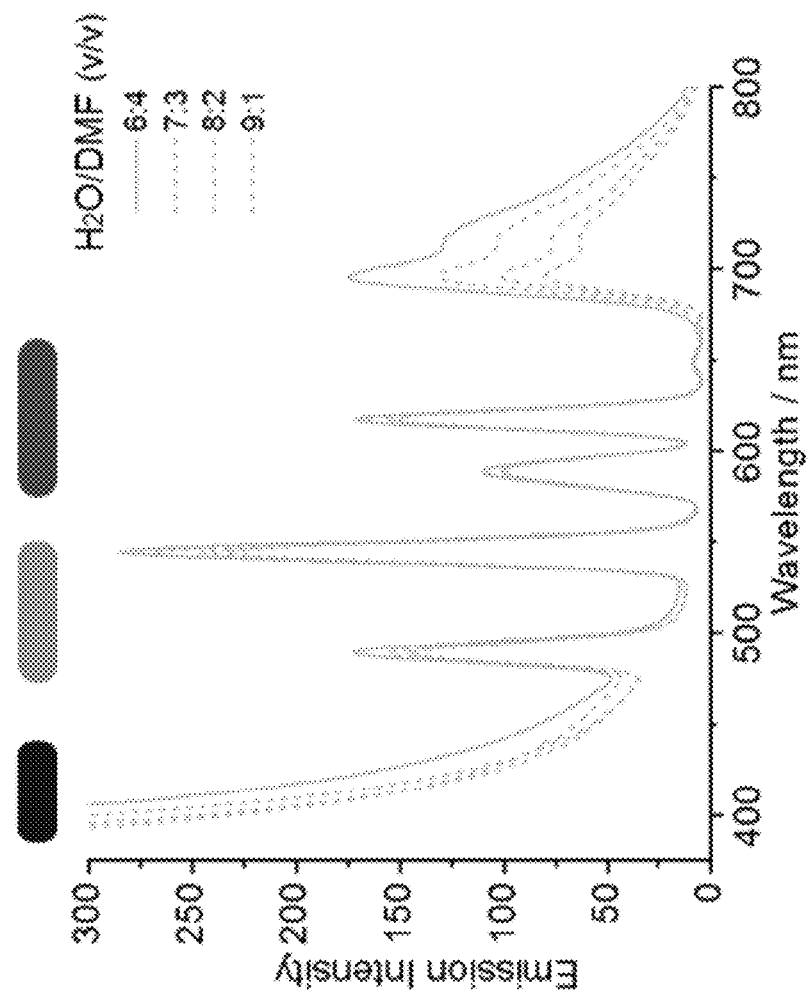

For example, the luminescent properties of fluid systems with $La^{3+}$, $Eu^{3+}$, $Tb^{3+}$, Tpy mixtures in 1:1:1:9 molar ratio were investigated. The conjugated non-substituted 2,2':6', 2"-terpyridine (Tpy) ligand forms isostructural coordinate complexes with several lanthanide ions (see, K. Binnemans, Chem. Rev. 2009, 109, 4283; e) L. Xu, G. Xu, Z. Chen, Coord. Chem. Rev. 2014, 273273-274, 47, Y. Cui, B. Chen, G. Qian, Coord. Chem. Rev. 2014, 273-274, 76, and S. J. Bradberry, A. J. Savyasachi, M. Martinez-Calvo, T. Gunnlaugsson, Coord. Chem. Rev. 2014, 273-274, 226, each of which is incorporated by reference in its entirety) in polar media (e.g. acetone, acetonitrile, DMF, DMSO), and $La^{3+}$, $Eu^{3+}$, $Tb^{3+}$ display blue (CIE coordinates of (0.16, 0.13)), red (CIE coordinates of (0.62, 0.30)) and green (CIE coordinates of (0.17, 0.56)) monochromic emission, respectively, upon binding Tpy derivatives (FIG. 6). Spectroscopic investigation of $EuCl_3$ titrated with Tpy indicates that lanthanide ions can coordinate to Tpy in a 1:3 ratio (FIGS. 9A-9B), consistent with previous reports on a similar ligand Mebip (2,6-bis(1'-methylbenzimidazolyl)pyridine. See, M. Burnworth, L. M. Tang, J. R. Kumpfer, A. J. Duncan, F. L. Beyer, G. L. Fiore, S. J. Rowan, C. Weder, Nature 2011, 472, 334, and) J. B. Beck, S. J. Rowan, J. Am. Chem. Soc. 2003, 125, 13922, A. Escande, L. Guénée, K. L. Buchwalder, C. Piguet, Inorg. Chem. 2009, 48, 1132, and D. W. R. Balkenende, S. Coulibaly, S. Balog, Y. C. Simon, G. L. Fiore, C. Weder, J. Am. Chem. Soc. 2014, 136, 10493, each of which is incorporated by reference in its entirety.

Figure 2A:
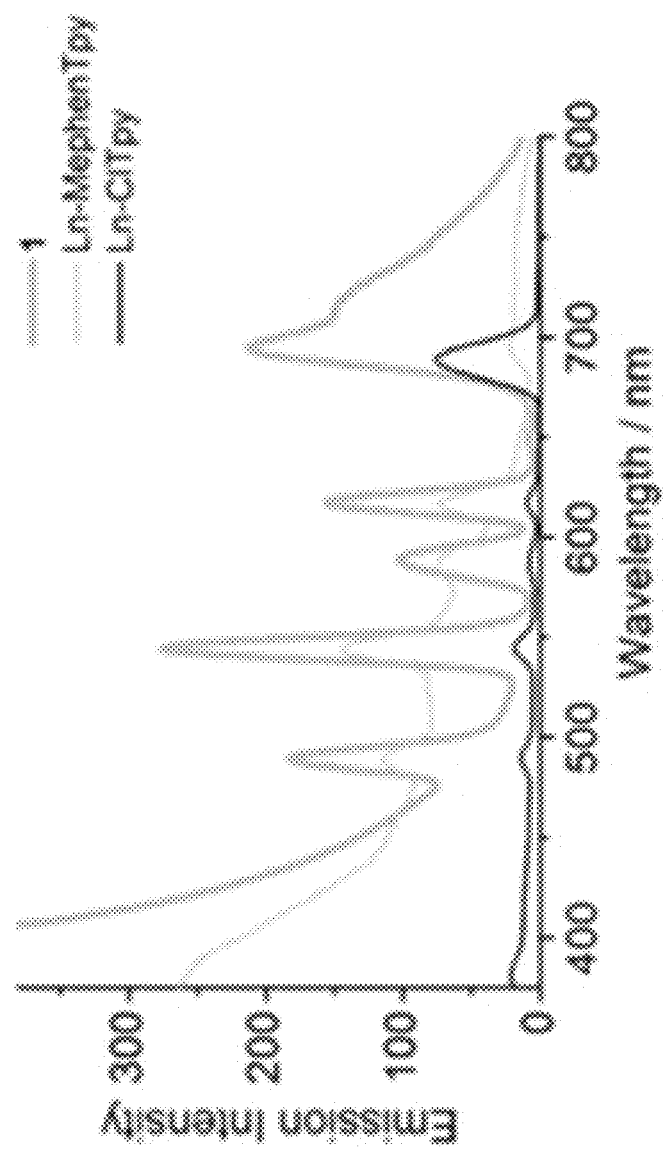
FIGS. 2A-2B show substituent effect on white luminescence.
Figure 2B:
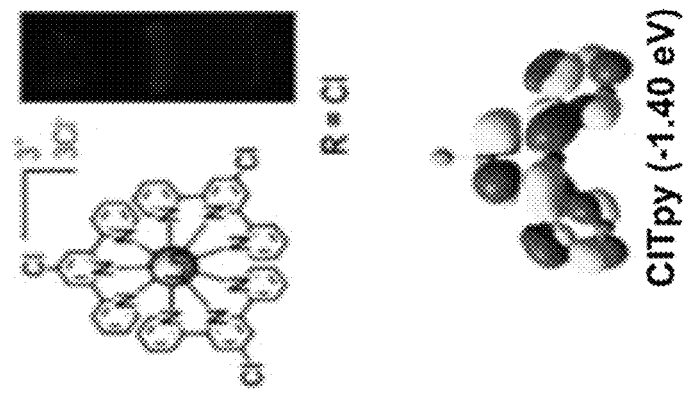
Figure 2B:
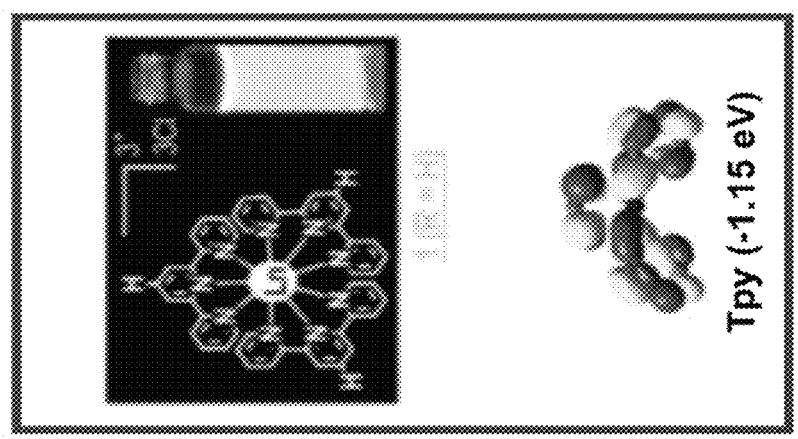
Figure 2B:
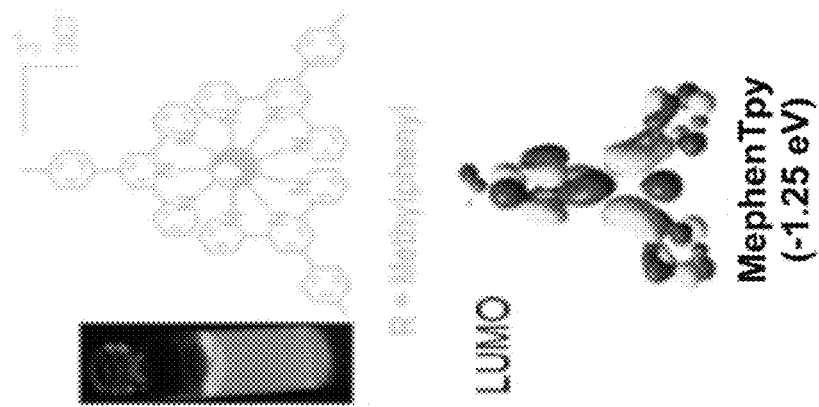
Figure 12:
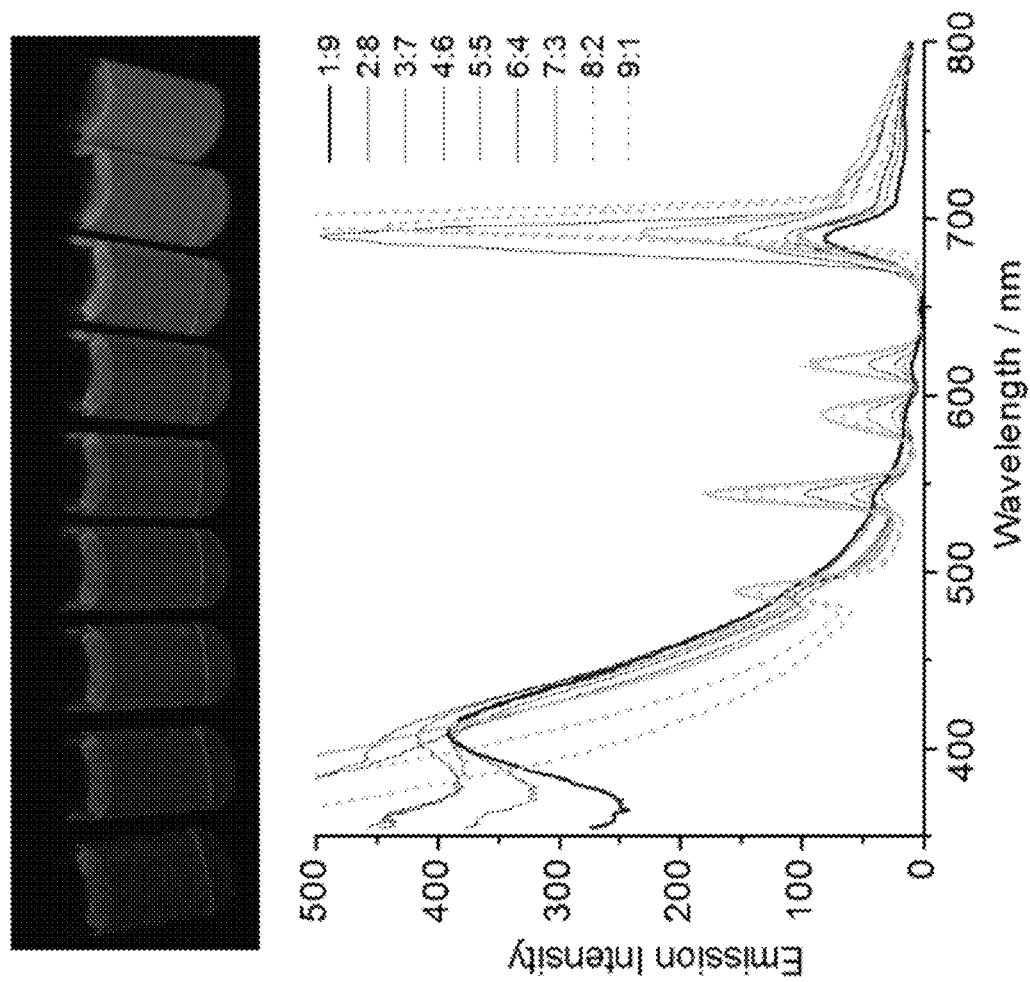
FIG. 12 shows water turn-on white luminescence of 1 (c=2.00×10$^{-3}$ mol/L): (top) photographs under UV lamp ($\lambda_{exc}$=365 nm) showing solvatochromism and (bottom) emission spectra recorded as a function of water fraction in $H_2O$/THF mixtures.
Figure 13A:
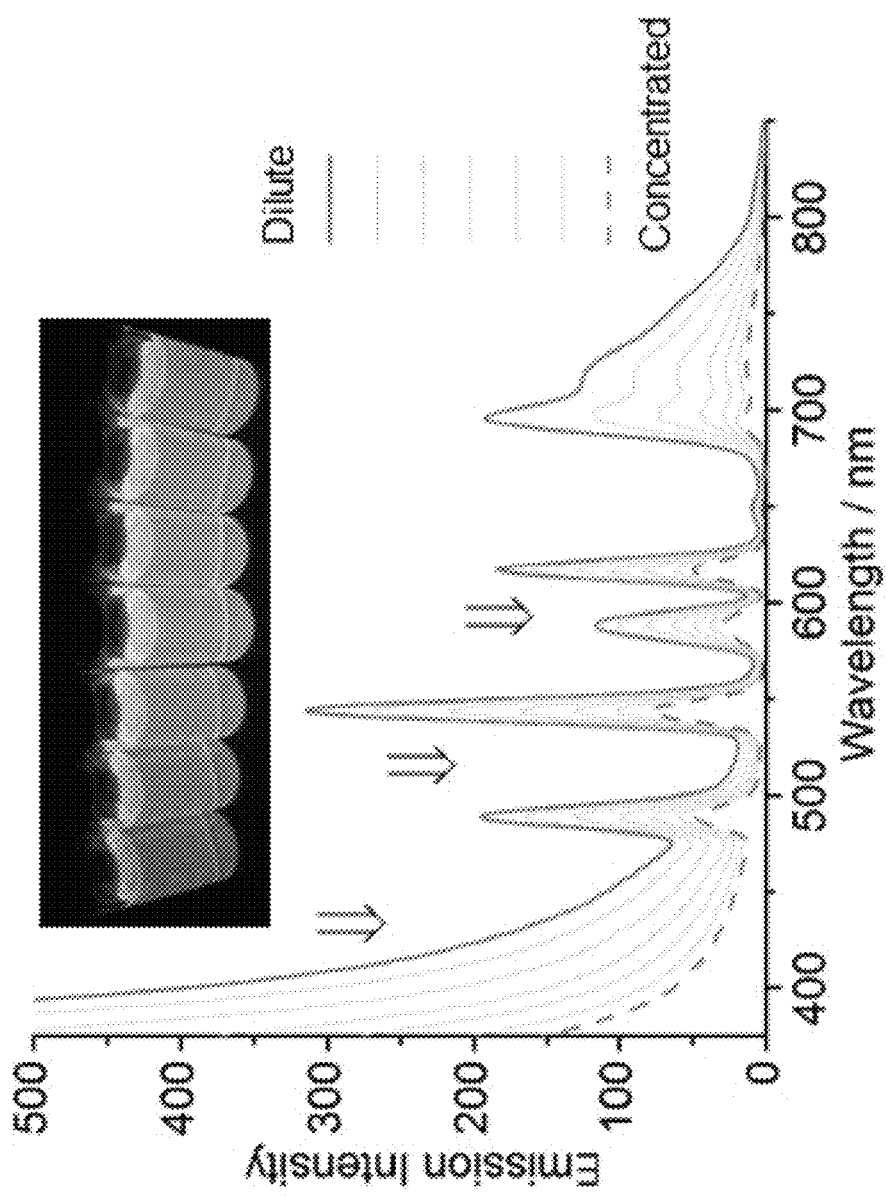
FIGS. 13A-13B show emission spectra.
Figure 13B:
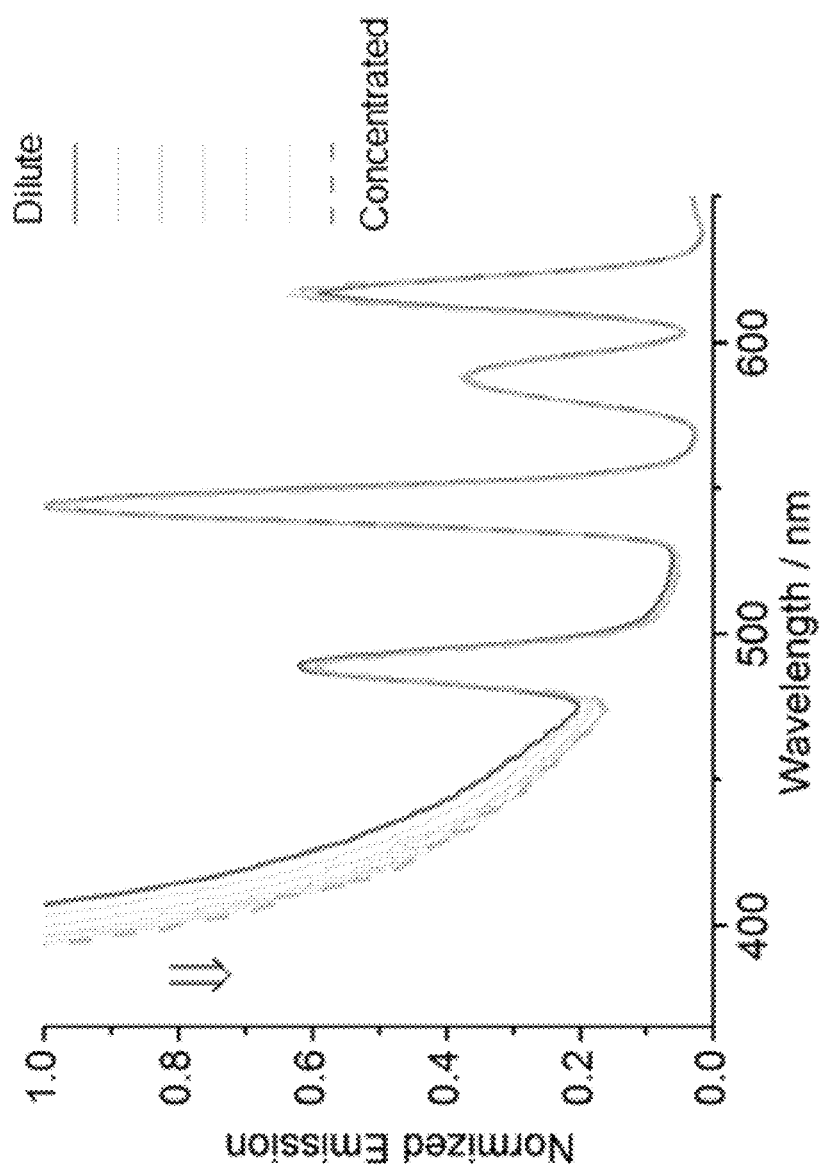
Figures 14A, 14B, 14C:
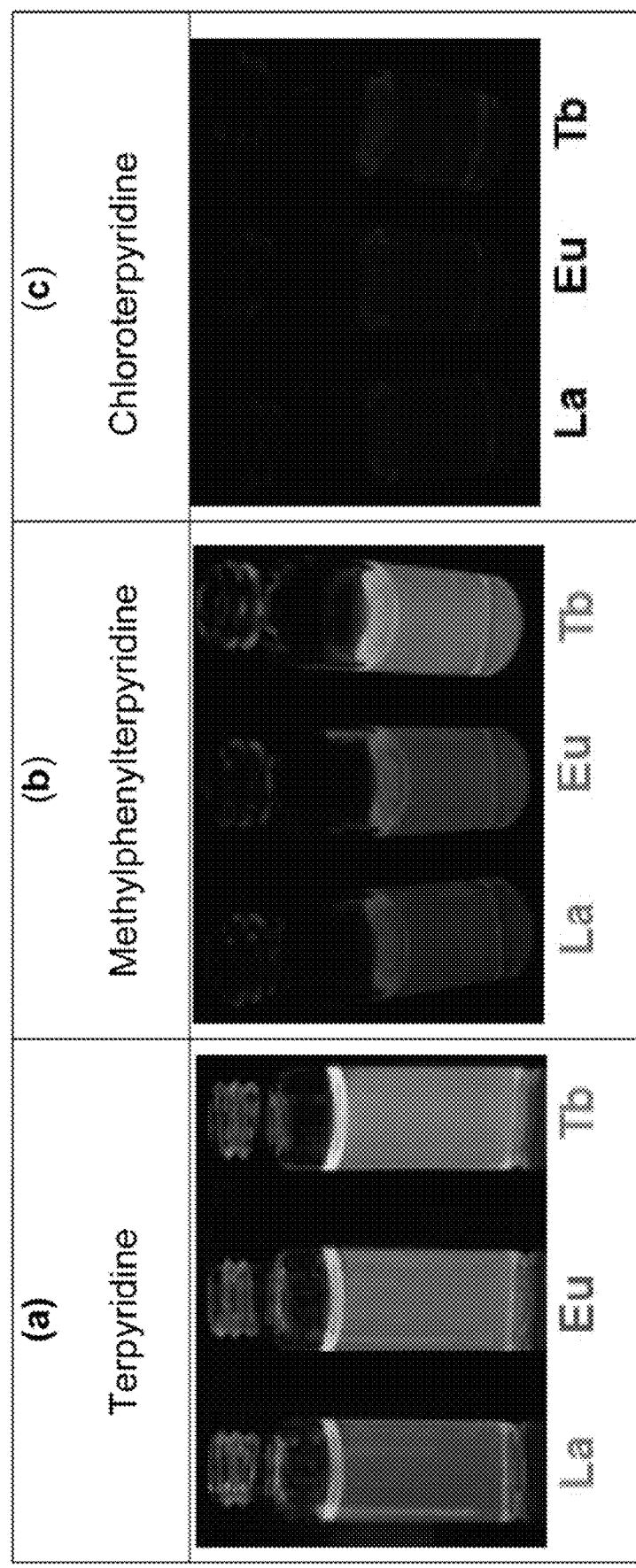
FIGS. 14A-14C show photographs of the solutions of lanthanide ions with different terpyridine derivatives.
Figure 16:
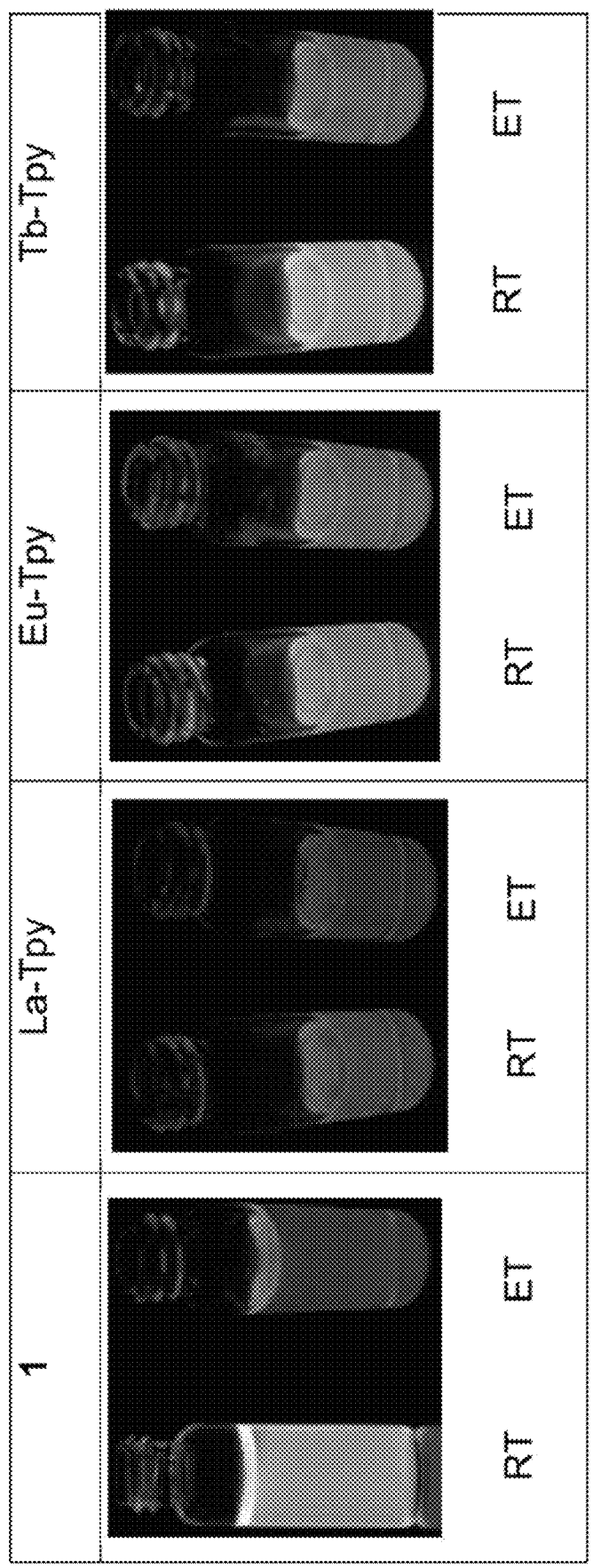
FIG. 16 shows photographs of the samples in $H_2O$/DMF (6:4, v/v) under UV light ($\lambda_{exc}$=365 nm) for comparison at RT and elevated temperature (55° C.).

While the hybrid molecular mixture (1) readily dissolves in $H_2O$ as well as various organic solvents (e.g. DMF, THF and acetone), its combined luminescence is highly solvent dependent. For example, as the $H_2O$/DMF ratio (v/v) gradually changes from 1:9 to 9:1 (FIGS. 1A-1B and 11A-11C), the combined luminescence of 1 switch from dark blue over bright white (at 6:4 v/v, also see FIGS. 13A-13B, with optimal CIE coordinates of (0.34, 0.31)) to faint yellow (CIE coordinates of (0.47, 0.33)). The most intense white light emission is highlighted as a shadow at the $H_2O$/DMF volume ratio of 6:4. This solvatochromism is also detected for 1 in a $H_2O$/THF mixture but with a higher water fraction for white emission (FIG. 12). The water-tuned light emission observed for 1 is different from the emission quenching observed with unsaturated coordination spheres of Ln(III)—ligand complexes upon water coordination (see, J. G. Bünzli, C. Piguet, Chem. Soc. Rev. 2005, 34, 1048, which is incorporated by reference in its entirety), and may reflect different Ln←N coordination bond behavior in polar solutions or excimer formation. See, A. H. Shelton, I. V. Sazanovich, J. A. Weinstein, M. D. Ward, Chem. Commun. 2012, 48, 2749, and M Han, Y. Tian, Z. Yuan, L. Zhu, B. Ma, Angew. Chem. Int. Ed. 2014, 53, 10908, each of which is incorporated by reference in its entirety. An observed decrease in lifetimes ($\tau$, at 545 nm) of the Tb-Tpy complex with increasing water fraction in $H_2O$/DMF mixtures (Table 1) and a shift in emission intensity from the blue to the green band as solution 1 is gradually concentrated (FIGS. 13A-13B) seems to support excimer formation.

red component (FIGS. 2A and 14B). In contrast, electron-withdrawing chloro-substituted Tpy results in nearly non-emissive solutions for the three lanthanide complexes (FIGS. 2B and 14C). DFT calculations (B3LYP, 6-31G(d)) corroborate that the emission quenching in this case can be assigned to a low-lying LUMO in comparison to 1 (−1.40 vs −1.15 eV) due to the presence of the electron-withdrawing Cl group, which leads to less efficient energy transfer from the organic sensitizer to the lanthanide ions (FIGS. 2B and 15). These dramatic differences demonstrate the effect of tuning ligand electronic structures on metal-coordination-based white luminescent molecular materials.

Figure 3A:
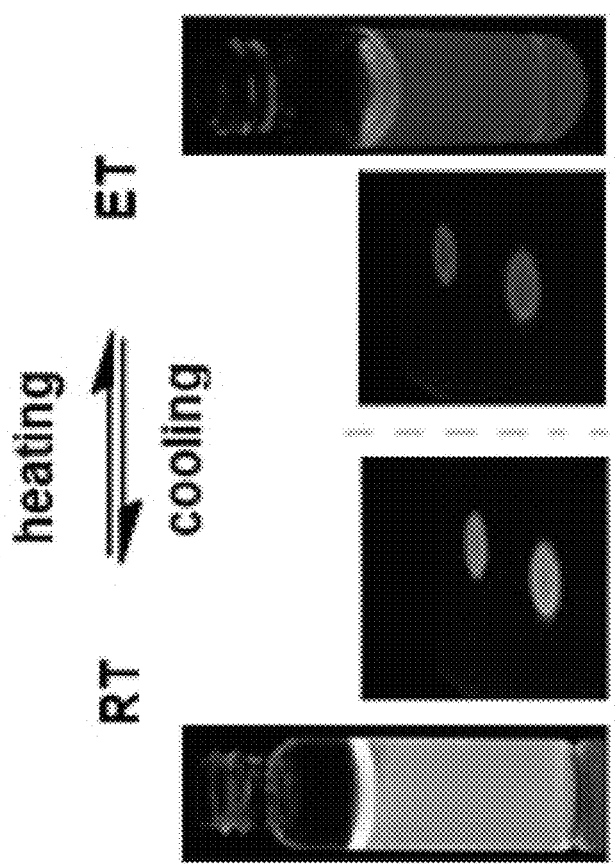
FIGS. 3A-3B show thermoresponsive luminescence of 1.
Figure 3B:
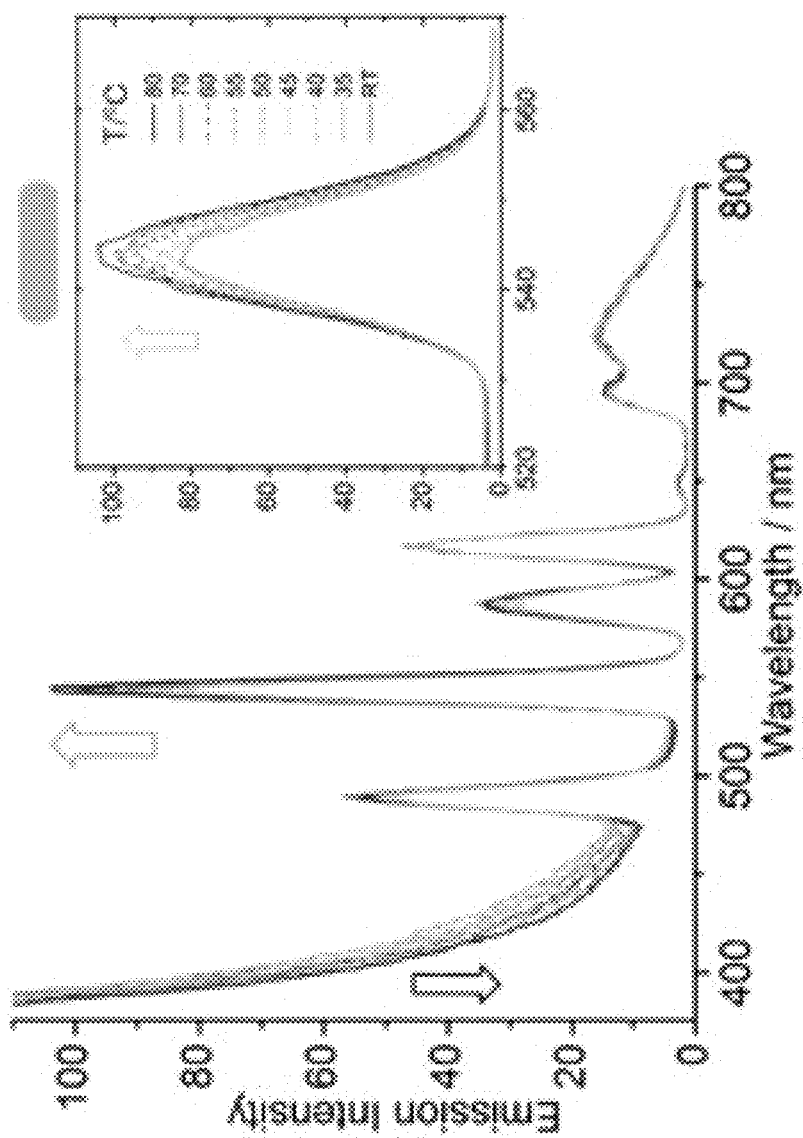

1 was furthermore found to exhibit reversible thermochromic properties in the fluid and solid state. As illustrated in FIG. 3A, luminescence changes reversibly between white (CIE coordinates of (0.34, 0.31)) at room temperature and red (CIE coordinates of (0.35, 0.18)) at elevated temperature in both dissolved and solvent evaporated material 1, as previously reported for solid state Eu(III) and Tb(III)—supported block copolymer systems. See, R. Shunmugam, G. N. Tew, J. Am. Chem. Soc. 2005, 127, 13567, which is incorporated by reference in its entirety. Emission spectra of 1 were recorded between room temperature and 80° C., and the thermally induced color change appear to originate from distinct chromophore dynamics: the blue emission band is attenuated, the red band unchanged, and the emission in the green enhances (FIG. 3B). This behavior may result from energy transfer from the blue band of La-Tpy complexes to the Tb-centered green emissive species. See, G. R. Whittell, M. D. Hager, U. S. Schubert, I. Manners, Nat. Mater. 2011, 10, 176, and P. Falcaro, S. Furukawa, Angew. Chem. Int. Ed. 2012, 51, 8431, each of which is incorporated by reference in its entirety. Molecular temperature sensors of this type could potentially be engineered into new luminescent colorimetric thermometer probes. See, P. Falcaro, S. Furukawa,

TABLE 1

Luminescence lifetimes (t at 545 nm) of Tb-Tpy complex in solutions with different H2O/DMF volume ratios

| | $H_2O$/DMF (v/v) | | | | | | | | |
|---|---|---|---|---|---|---|---|---|---|
| | 1:9 | 2:8 | 3:7 | 4:8 | 5:5 | 6:4 | 7:3 | 8:2 | 9:1 |
| $\tau_{em-545\,nm}$ (ms) | 0.555 | 0.522 | 0.520 | 0.511 | 0.503 | 0.495 | 0.486 | 0.427 | 0.388 |

A standard strategy in tuning the luminescent properties of organic materials is via chromophore molecular design. For example, the electronic transition energy gap and molecular orbital energy levels in luminescent metal-coordinate complexes highly impact their light harvesting capability and energy transfer efficiency. See, X. Zhang, W. Liu, G. Z. Wei, D. Banerjee, Z. Hu, J. Li, J. Am. Chem. Soc. 2014, 136, 14230, and Z. Wei, Z. Gu, R. K. Arvapally, Y. Chen, R. N. McDougald, J. F. Ivy, A. A. Yakovenko, D. Feng, M. A. Omary, H. Zhou, J. Am. Chem. Soc. 2014, 136, 8269, each of which is incorporated by reference in its entirety. To gain better insight into how ligand chemical structure affects Tpy-Ln(III) RGB light-emitting properties, three different terpyridine derivatives were examined. With otherwise identical solvent compositions, a weakly electron-donating methylphenyl substituent at the 4'-position of Tpy affords a cyan solution with CIE coordinates of (0.17, 0.24) at the same metal-ligand ratio as that for the white luminescent 1 (FIG. 2B). Compared with 1, the absence of white emission could be due to a smaller contribution from the $Eu^{3+}$-based Angew. Chem. Int. Ed. 2012, 51, 8431, Y. Cui, H. Xu, Y. Yue, Z. Guo, J. Yu, Z. Chen, J. Gao, Y. Yang, G. Qian, B. Chen, J. Am. Chem. Soc. 2012, 134, 3979, and J. Feng, K. Tian, D. Hu, S. Wang, S. Li, Y. Zeng, Y. Li, G. Yang, Angew. Chem. Int. Ed. 2011, 50, 8072, each of which is incorporated by reference in its entirety.

Figure 4A:
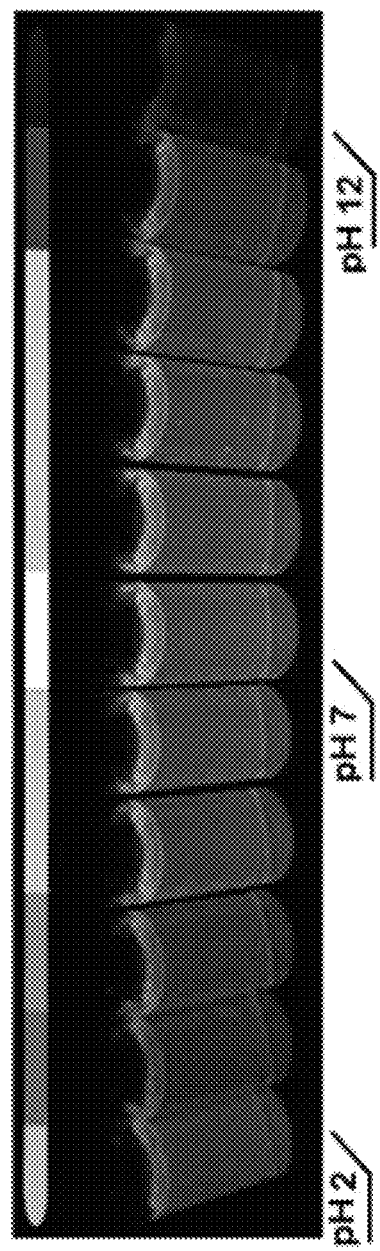
FIGS. 4A-4B show pH-responsive property of 1 ($H_2O$/DMF=6:4, v/v; c=1.50×10$^{-3}$ M).
Figure 4B:
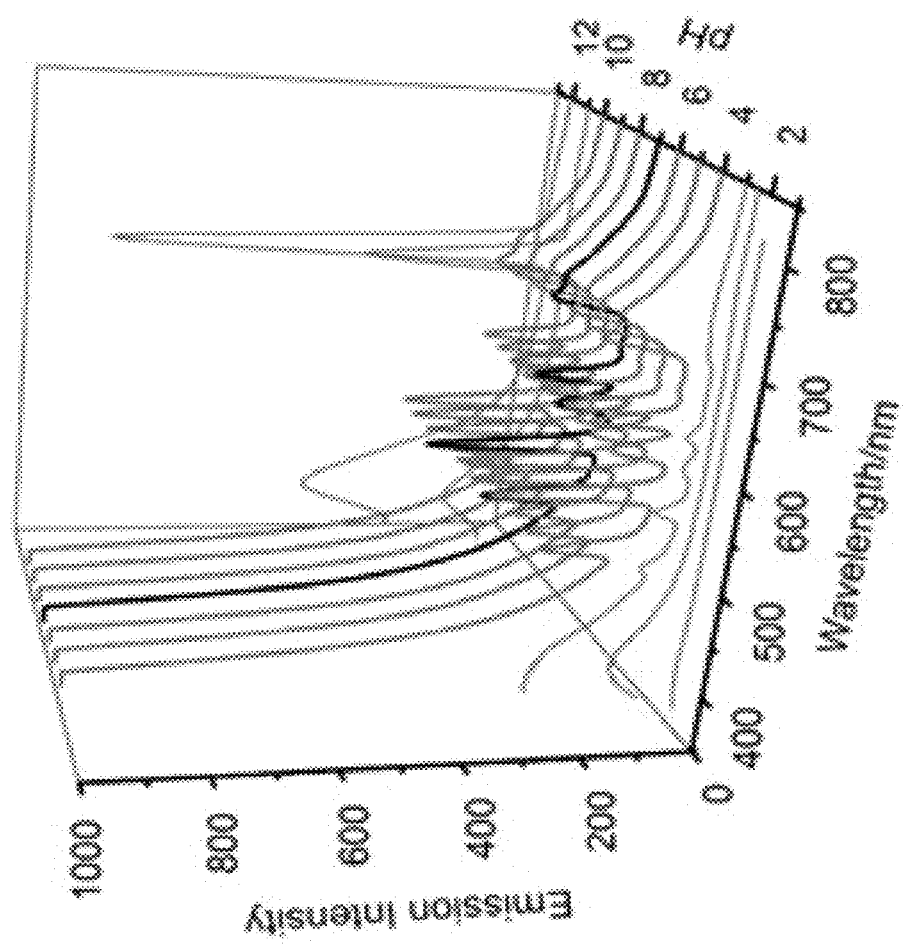
Figure 17:
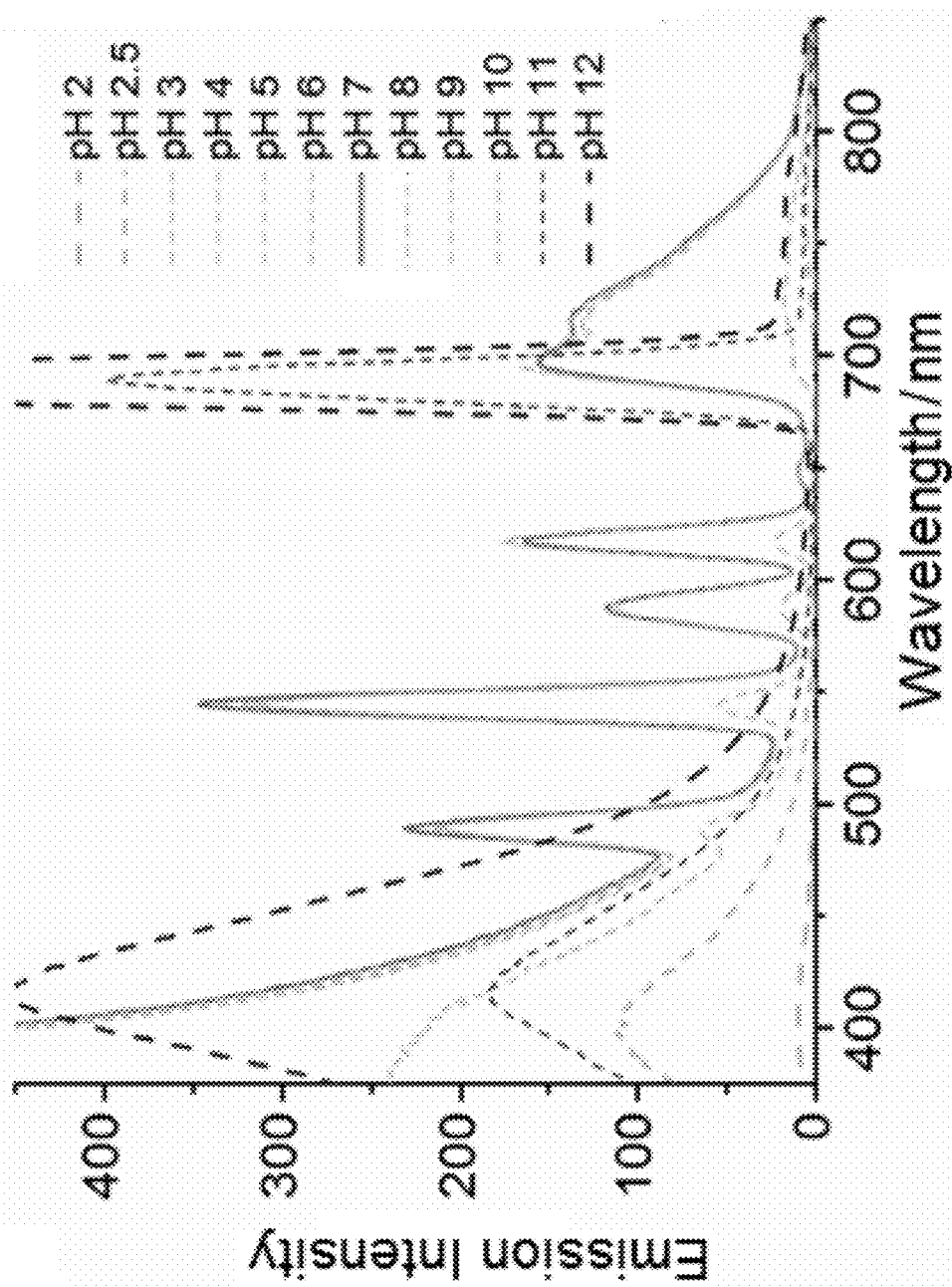
FIG. 17 shows emission spectra of 1 ($H_2O$/DMF=6:4, v/v) recorded at different pH ($\lambda_{exc}$=365 nm).
Figure 18A:
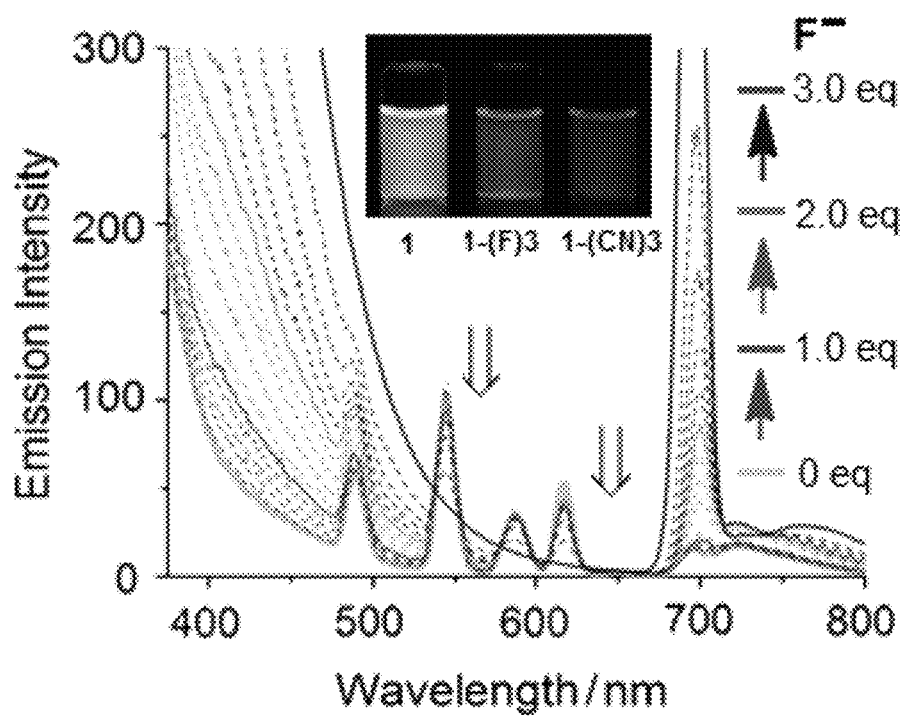
FIGS. 18A-18D show recorded emission spectra of anion titration of 1 with TBAF in $H_2O$/DMF (6:4, v/v).
Figure 18B:
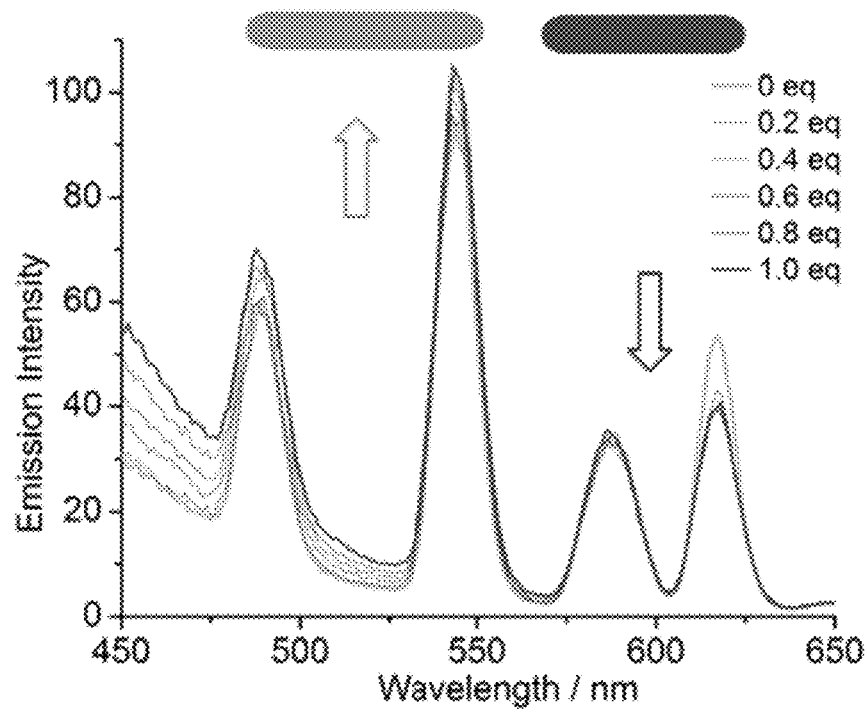
Figure 18C:
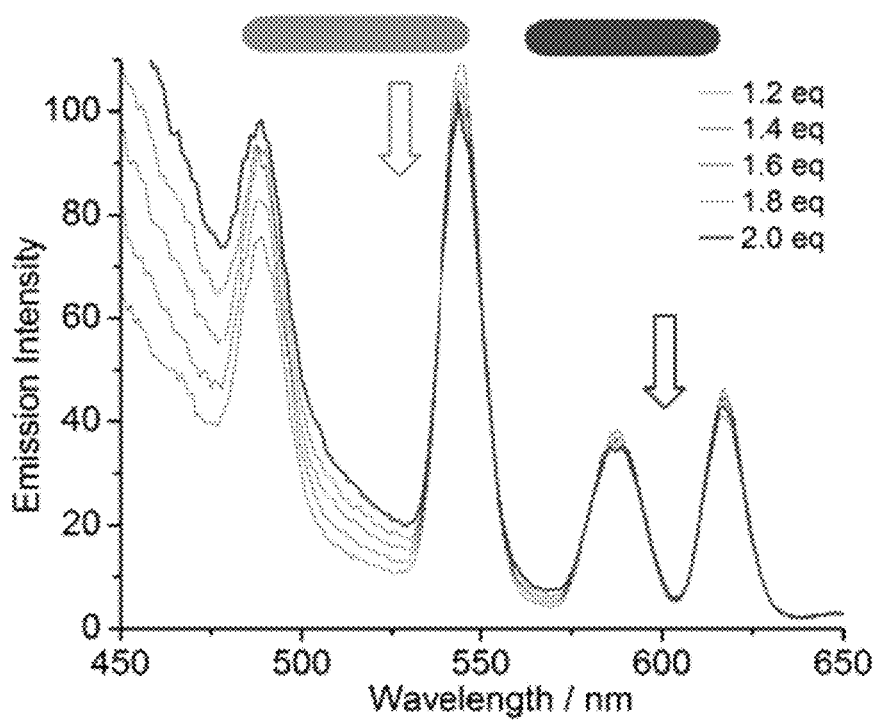
Figure 18D:
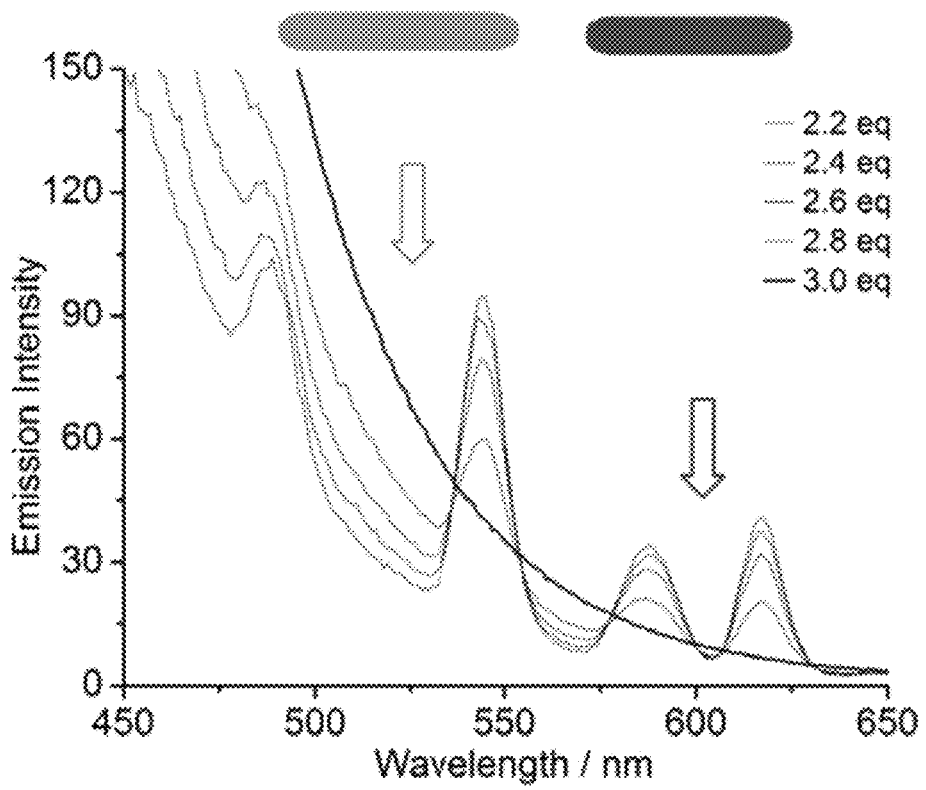

Molecular pH sensors that function over a broad pH range are particularly useful but challenging to design and as a result most function under either predominantly acidic or basic conditions. See, I. V. Nesterova, E. E. Nesterov, J. Am. Chem. Soc. 2014, 136, 8843, which is incorporated by reference in its entirety. Broad spectrum pH sensitivity of material 1 was observed in solution: 1) between pH 4 and pH 10 the solutions emit variations of white light with the strongest intensity at neutral pH; 2) a switch from blue to cyan emission is observed for solutions at pH <4; 3) blue emitting solutions are formed at pH >10 (FIGS. 4A-4B and 17). At pH 3 and below, all emission bands are dramatically reduced, indicative of general dissociation of metal-ligand bonds due to protonation of the pyridyl coordination site ($pKa_{[H2Tpy]2+}$=3.57, $pKa_{[HTpy]+}$=4.54). See, E. Farkas, E. A. Enyedy, G. Micera, E. Garribba, *Polyhedron* 2000, 19, 1727, which is incorporated by reference in its entirety. Likewise, the three emissive bands completely fade at pH 11 due to metal-coordinate complex disassembly induced by the formation of lanthanide hydroxide $Ln(OH)_3$ and "free" Tpy ligand with $\lambda_{em(max)}$=413 nm. Both of these quenching mechanisms are reversible and white light emission returns upon neutralization. Overall, the sensitive response to broad range pH variations and the sharp quenching of white light at two extreme pH levels suggest the design of 1 could be of value in new luminescent molecular pH sensors.

Figure 5A:
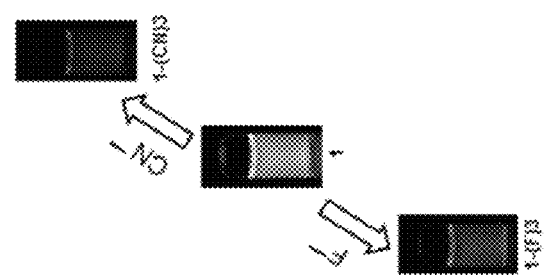
FIGS. 5A-5B show chemoresponsive luminescence of 1.
Figure 5A:
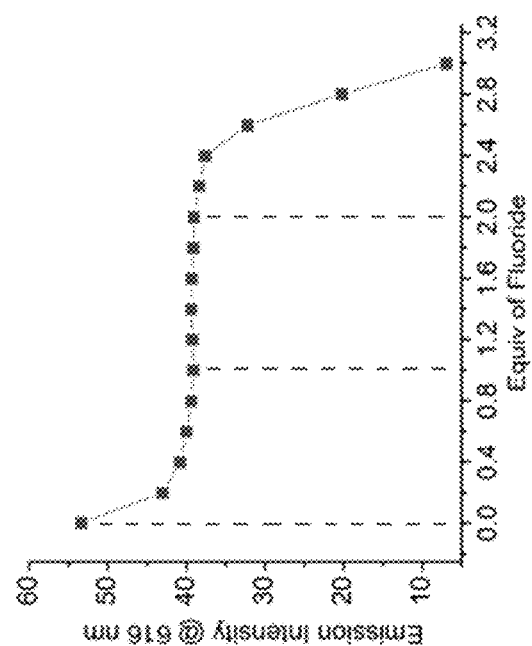
Figure 5A:
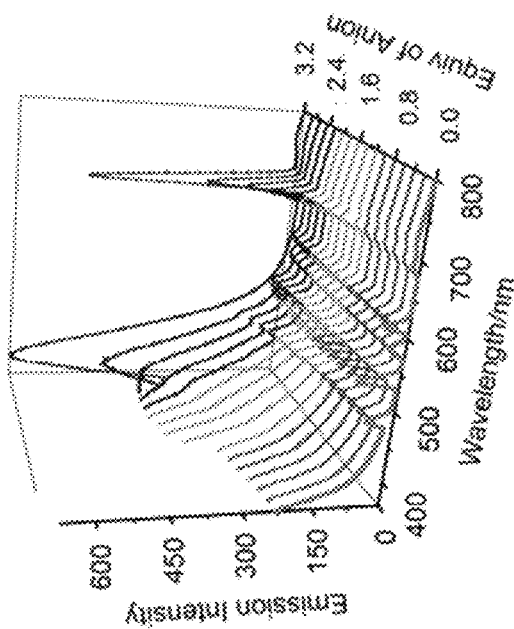
Figure 5B:
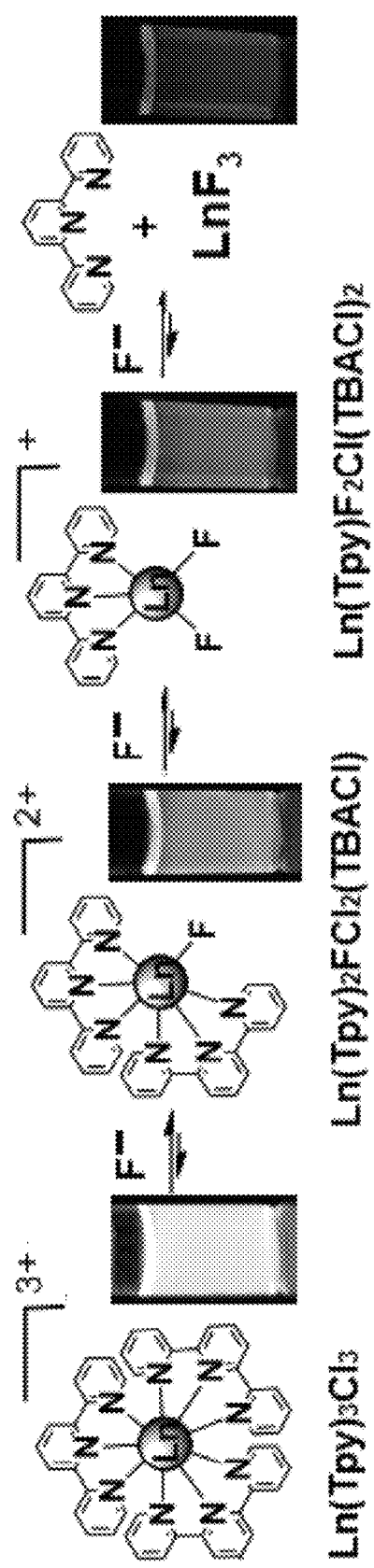

To explore potential applications of 1 in detection of medically and environmentally relevant anions, its responsive behavior was investigated upon competitive binding of fluoride ($F^-$) and cyanide ($CN^-$). See, S. Ayoob, A. K. Gubta, *Crit. Environ. Sci. Technol.* 2006, 36, 433, and Z. Xu, X. Chen, H. N. Kim, J. Yoon, *Chem. Soc. Rev.* 2010, 39, 127, each of which is incorporated by reference in its entirety. The majority of previously reported fluoride probes include hydrogen bonding donor species (F . . . H-D), Lewis acidic organoboron complexes and other cationic organometallics. See, M. Cametti, K. Rissanen, *Chem. Commun.* 2009, 45, 2809, B. Sui, B. Kim, Y. Zhang, A. Frazer, K. D. Belfield, *ACS Appl. Mater. Interfaces* 2013, 5, 2920, C. R. Wade, A. E. J. Broomsgrove, S. Aldridge, F. P. Gabbaï, *Chem. Rev.* 2010, 110, 3958, F. Jäkle, Chem. Rev. 2010, 110, 3985, and C. R. Wade, I. S. Ke, F. P. Gabbaï, *Angew. Chem. Int. Ed.* 2012, 51, 478, each of which is incorporated by reference in its entirety. Based on the formation of F-bridged supramolecular motifs, luminescent Eu(III) complexes have recently been explored for sensing of fluoride anions (see, T. Liu, A. Nonat, M. Beyler, M. Regueiro-Figueroa, K. N. Nono, O. Jeannin, F. Camerel, F. Debaene, S. Cianférani-Sanglier, R. Tripier, C. Platas-Iglesias, L. Charbonnière, *Angew. Chem. Int. Ed.* 2014, 53, 7259, which is incorporated by reference in its entirety), but no molecular probes have demonstrated detection of multiple anions. Here both $F^-$ and $CN^-$ detection was demonstrated in solutions of 1. Fluoride as a hard base can strongly interact with lanthanide ions as hard acids and the stepwise substitution of Tpy by $F^-$ was monitored by an emission titration with tetra-n-butylammonium fluoride (TBAF) (FIGS. 5A and 18A-18D). Upon initial addition of TBAF, a sharp quenching of the white luminescence was identified, which is ascribed to a quick drop in the red emission. Upon further fluoride titration up to 2.0 equiv, the metal-based emission bands gradually decrease with the generation of the two emissive intermediates of partially fluoride-bonded species of $[Ln(Tpy)_2F]^{2+}$ and $[Ln(Tpy)F_2]^+$ (FIG. 5B). These species are fully quenched upon further addition of 1.0 equiv of $F^-$, leading to the generation of blue solution of "free" Tpy ligand ($\lambda_{em}$=413 nm) with CIE coordinates of (0.15, 0.16) and giving rise to visible precipitates of $LnF_3$ ($K_{sp(LaF3)}$=3.26×10$^{-21}$, $K_{sp(EuF3)}$=1.37× $10^{-19}$ and $K_{sp(TbF3)}$=2.85×10$^{-19}$). See, H. Itoh, H. Hachiya, M. Tsuchiya, Y. Suzuki, Y. Asano, *Bull. Chem. Soc. Jpn.* 1984, 57, 1689, which is incorporated by reference in its entirety. Notably, cyanide, as a strong field ligand and another competing electron donor, can also disengage the Ln(III)—Tpy coordination bonds (FIG. 18A, inset), while no significant changes in luminescence were observed for anions such as $Cl^-$, $Br^-$, $I^-$, $NO_3^-$, $CO_3^{2-}$ and $SO_4^{2-}$, demonstrating the selective chemochromic ability of the simple molecular luminescent platform. This robust selectivity is due to the luminescence switch-off mechanism observed for hybrid material 1 by $F^-$ and $CN^-$, in contrast to lanthanide complex anion sensors based on luminescence signal enhancement by replacement of coordinate water molecules. See, J. G. Bünzli, C. Piguet, Chem. Soc. Rev. 2005, 34, 1048, M. Roushan, X. Zhang, J. Li, *Angew. Chem. Int. Ed.* 2012, 51, 436, K. Wong, G. Law, Y. Yang, W. Wong, Adv. Mater. 2006, 18, 1051-1054, and M. J. Langton, O. A. Blackburn, T. Lang, S. Faulkner, P. D. Beer, *Angew. Chem. Int. Ed.* 2014, 53, 11463, each of which is incorporated by reference in its entirety.

Finally, mechanochromic behavior of material 1 in solution was demonstrated (FIG. 6); a reversible color change from white to red (CIE coordinates of (0.43, 0.23)) was observed after a 15 sec exposure to ultrasound at room temperature. Similar dynamics have recently been reported for single color emission from Mebip-Eu(III) coordination complexes (see, D. W. R. Balkenende, S. Coulibaly, S. Balog, Y. C. Simon, G. L. Fiore, C. Weder, *J. Am. Chem. Soc.* 2014, 136, 10493, which is incorporated by reference in its entirety), but the unique multi-color chromism disclosed here results from a mechanically induced imbalance in the combined RGB light emission of material 1; spectroscopy shows that the blue and red bands remain unchanged while the green is attenuated immediately following the ultrasound exposure. After 15 min, the green band has recovered and white light emission returns, confirming that mechanically induced cleavage of the dynamic Ln-N coordination bond in Tb-Tpy complexes is reversible.

A new and simple strategy to engineer white luminescent materials in organic/aqueous solution phases shows that the lanthanide-Tpy complex mixture enables more responsive luminescent sensing because of the combined emission intensities from three separate chromophores compared to other stimuli-responsive luminescent materials with sensing mechanisms based on only one transition. This simple RGB-combined molecular white-light luminescence is highly sensitive to variations in temperature, pH, mechanical force and presence of chemical anions, and the concomitant color changes are easily assessed via Ln(III)—coordination bond changes. The ease of fabrication of these multi-stimuli-responsive white light emitting fluids allows easy integration into more advanced engineering systems for new applications in semi-solid state lighting and micro-fluidic detection platforms. Detailed studies on such systems will be published elsewhere.

Embodiments in Polymer Gel

Smart materials have emerged as a new type of polymeric soft matter in which dynamic bonds are incorporated, thus leading to interesting stimuli-responsive behaviors since the dynamic bonds are able to reversibly undergo tunable changes when exposed to environmental stimuli. See, R. J. Wojtecki, M. A. Meador, S. J. Rowan, *Nature Materials,* 2011, 10, 14, F. D. Jochum, P. Theato, *Chem. Soc. Rev.,* 2013, 42, 7468, and Y. H. Jin, C. Yu, R. J. Denman, W. Zhang, *Chem. Soc. Rev.,* 2013, 42, 6634, each of which is incorporated by reference in its entirety. This unique feature provides many opportunities for promising applications in the areas of sensing, biomedicine, environment and energy storage. Among the dynamic bonds, supramolecular complexes based on metal-coordination are particularly attractive because these metal-functionalized species can exhibit added values. See, R. Whittell, M. D. Hager, U. S. Schubert, I. Manners, *Nature Materials,* 2011, 10, 176, M. Burnworth, L. M. Tang, J. R. Kumpfer, A. J. Duncan, F. L. Beyer, G. L. Fiore, S. J. Rowan, C. Weder, *Nature,* 2011, 472, 334, H. Ejima, J. J. Richardson, K. Liang, J. P. Best, M. P. van Koeverden, G. K. Such, J. W. Cui, F. Caruso, *Science,* 2013, 341, 154, and N. Holten-Andersen, M. J. Harrington, H. Birkedal, B. P. Lee, P. B. Messersmith, K. Y. C. Lee, J. Herbert Waite, PNAS, 2011, 108, 2651, each of which is incorporated by reference in its entirety. Disclosed herein is a new approach to the synthesis of lanthanide-based hydrogels. The design strategy for luminescence tunable metallohydrogels will be discussed with an emphasis on the white light emission and stimuli-responsive properties for potential applications as sensing materials.

Among the stimuli-responsive light emitting materials, lanthanide ($Ln^{3+}$) M-L coordination polymers are increasingly explored in the design of advanced functional materials due to their unique metal-controlled photoluminescence (4f-4f transitions). See, Handbook on the Physics and Chemistry of Rare Earths (Eds:Gschneidner Jr., K. A.; Bunzli, J.-C. G.; Pecharsky, V. K.), Elsevier Science, Amsterdam, The Netherlands, 2010, Vol. 40, Chapter 247, Bunzli, J. G.; Piguet, C. Chem. Soc. Rev. 2005, 34, 1048, Binnemans, K. Chem. Rev. 2009, 109, 4283, Falcaro, P.; Furukawa, S. Angew. Chem. Int. Ed. 2012, 51, 8431, Cui, Y; Xu, H.; Yue, Y.; Guo, Z.; Yu, J.; Chen, Z.; Gao, J.; Yang, Y.; Qian, G.; Chen, B. J. Am. Chem. Soc. 2012, 134, 3979, Ananias, D.; Almeida Paz, F. A.; Yufit, D. S.; Carlos, L. D.; Rocha, J. J. Am. Chem. Soc. 2015, 137, 3051, and Kerbellec, N.; Kustaryono, D.; Haquin, V; Etienne, M.; Daiguebonne, C.; Guillou, O. Inorg. Chem. 2009, 48, 2837, each of which is incorporated by reference in its entirety. Using light-emitting lanthanide metal-coordinate complex probes, it was recently demonstrated how a simple red, green and blue (RGB) mixing approach offers remarkable versatility in the design of multi-stimuli-responsive white luminescent fluids. See, Chen, P.; Holten-Andersen, N. Adv. Optical Mater. 2015, DOI: 10.1002/adom.201400493, which is incorporated by reference in its entirety. Additional demonstrations by others of white light emitting supramolecular gels and lanthanide-doped emissive metallogels confirm that dynamic Ln-N^N^N interactions can indeed dominate stimuli-responsive material behaviors. See, Praveen, V. K.; Ranjith, C.; Armaroli, N. Angew. Chem. Int. Ed. 2014, 53, 365, Kim, H.; Chang, J. Y RSC Adv. 2013, 3, 1774, Wang, T.; Li, P.; Li, H. ACS Appl. Mater. Interfaces 2014, 6, 12915, Rao, K. V.; Datta, K. K. R.; Eswaramoorthy, M.; George, S. J. Adv. Mater. 2013, 25, 1713, Giansante, C.; Raffy, G.; Schafer, C.; Rahma, H.; Kao, M.; Olive, A. G. L.; Guerzo, A. D. J. Am. Chem. Soc. 2011, 133, 316, Bairi, P.; Roy, B.; Chakraborty, P.; Nandi, A. K. ACS Appl. Mater. Interfaces 2013, 5, 5478, Roy, S.; Katiyar, A. K.; Mondal, S. P.; Ray, S. K.; Biradha, K. ACS Appl. Mater. Interfaces 2014, 6, 11493, Sutar, P.; Suresh, V. M.; Maji, T. K. Chem. Commun. 2015, 51, 9876, Saha, S.; Das, G.; Thote, J.; Banerjee, R. J. Am. Chem. Soc. 2014, 136, 14845, Beck, J. B.; Rowan, S. J. J. Am. Chem. Soc. 2003, 125, 13922, Kotova, O.; Daly, R.; dos Santos, C. M. G.; Boese, M.; Kruger, P. E.; Boland, J. J.; Gunnlaugsson, T. Angew. Chem. Int. Ed. 2012, 51, 7208, Ma, X.; Yu, D.; Tang, N.; Wu, J. Dalton Trans., 2014, 43, 9856, Balkenende, D. W. R.; Coulibaly, S.; Balog, S.; Simon, Y. C.; Fiore, G. L.; Weder, C. J. Am. Chem. Soc. 2014, 136, 10493, and Martinez-Calvo, M.; Kotova, O.; Mobius, M. E.; Bell, A. P.; McCabe, T.; Boland, J. J.; Gunnlaugsson, T. J. Am. Chem. Soc. 2015, 137, 1983, each of which is incorporated by reference in its entirety. However, little work has been done to characterize the fundamental stimuli-responsive coupling mechanisms between the reversible nature of light emitting lanthanide metal-coordinate complex mechanics and the resulting stimuli-responsive optical dynamics.

Disclosed herein is a light-emitting metallogel functionalized with lanthanide metal ion-ligand (M-L) coordination complexes via a terpyridyl end-capped 4-Arm-PEG polymer. It was demonstrated 1) how the optical properties of these highly luminescent polymer networks are readily modulated by lanthanide metal ion stoichiometry, and 2) how the dynamic nature of the Ln-N coordination bonding offers reversible stimuli-responsive properties of sol-gel systems and solid thin films.

Figure 23:
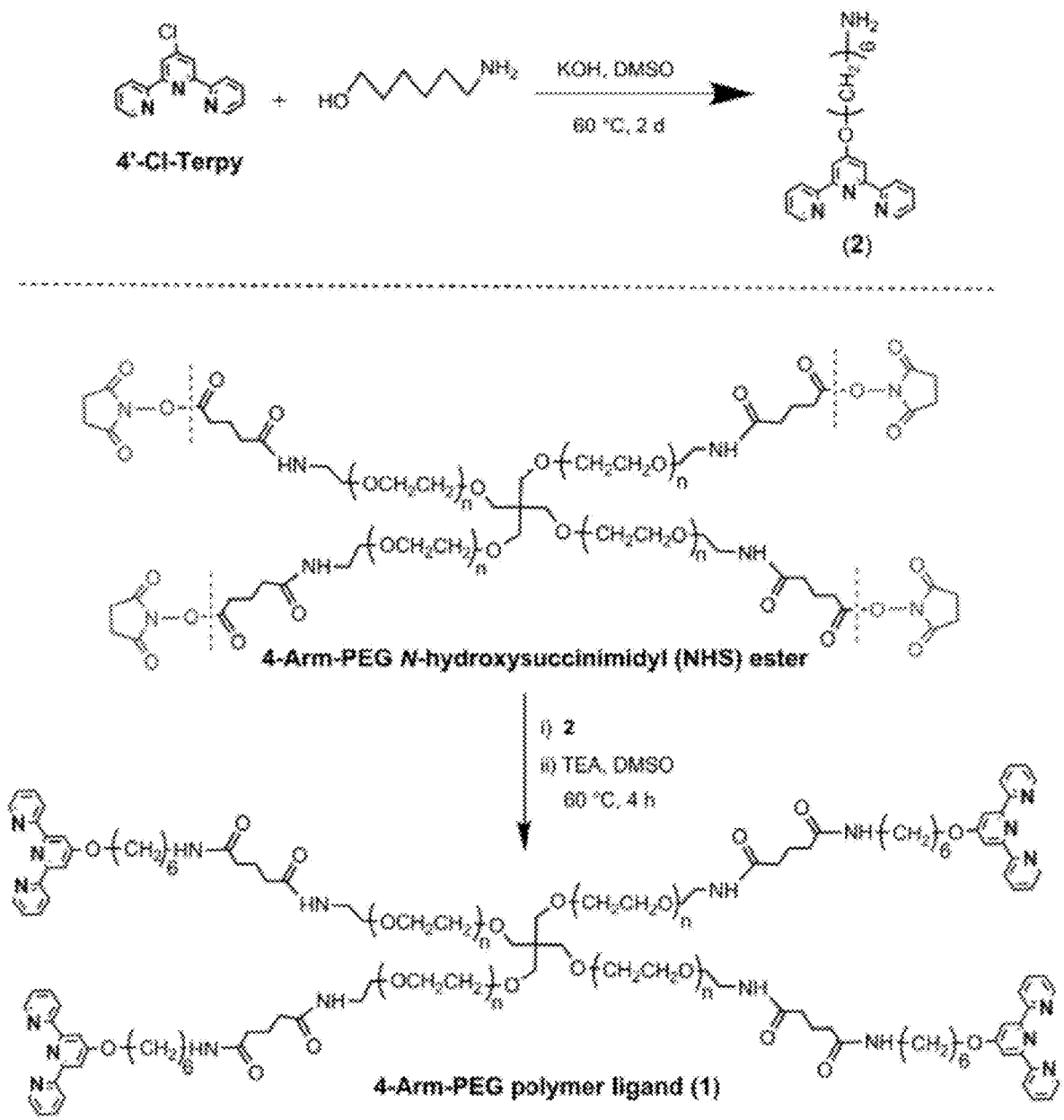
FIG. 23 shows a schematic of synthesis of 4-Arm-PEG polymer ligand 1.

The synthesis of terpyridyl end-capped 4-Arm-PEG polymer (1) starts with the alkoxylation of 4'-chloro-2,2':6',2"-terpyridine by 6-amino-1-hexanol in anhydrous DMSO under basic condition (FIG. 23). After standard purification, the chelating terpyridyl ligands are subsequently coupled via the quantitative amidation reaction between an active 4-Arm-PEG N-hydroxysuccinimidyl (NHS) ester (MS=5269 Da) and primary amine substituents (—$NH_2$) in dry DMSO at 60° C. The purified polymer 1 is soluble in polar organic solvent such as $CH_3CN$, DMF, DMSO and $CH_3OH$.

Figure 19A:
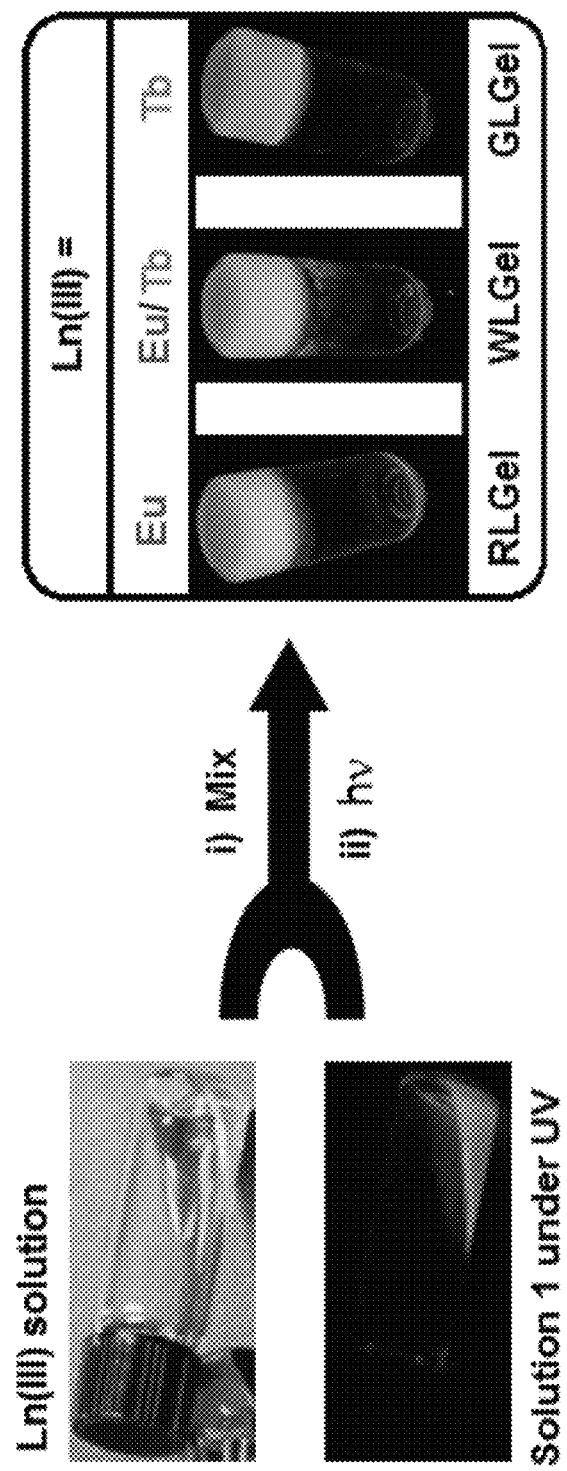
FIGS. 19A-19B show chemical structures.
Figure 19B:
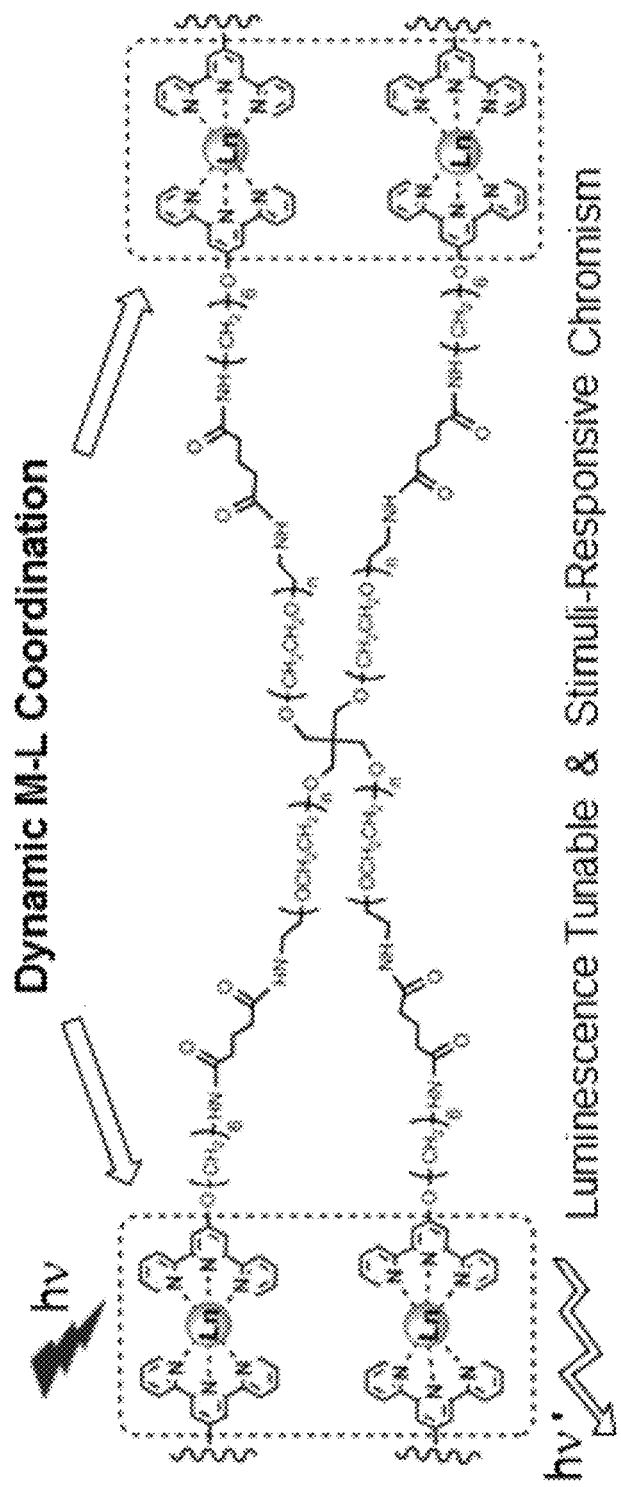
Figure 24:
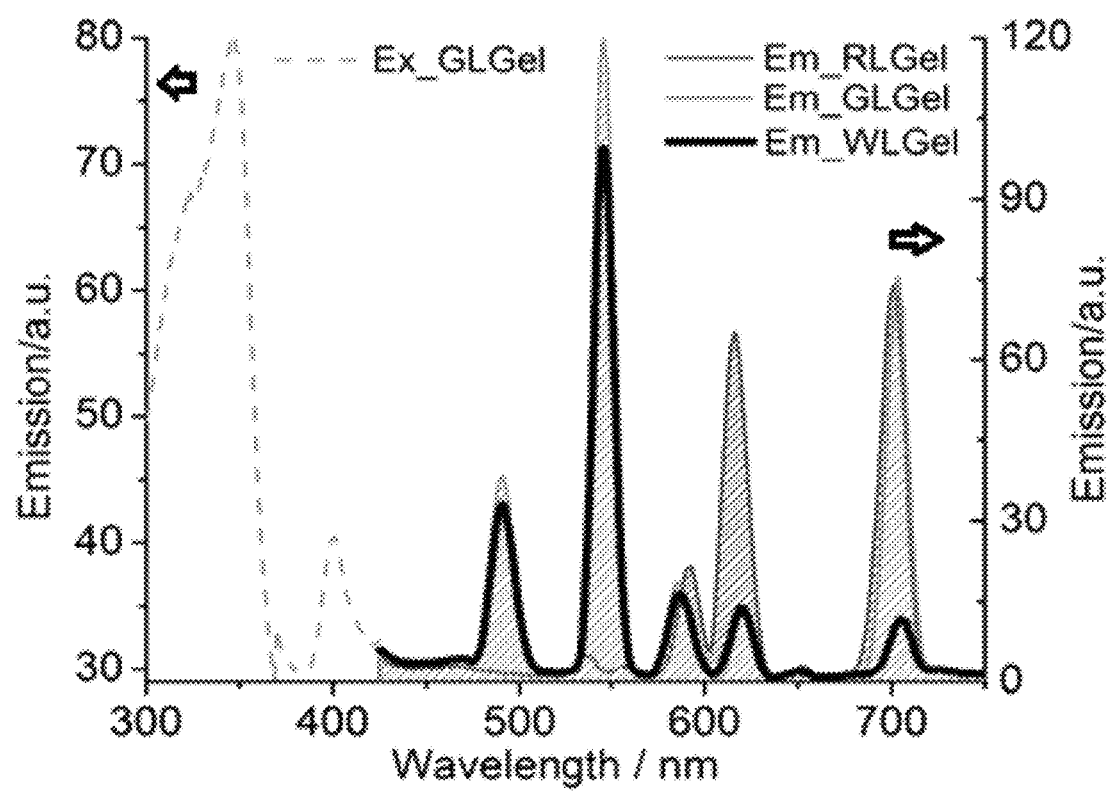
FIG. 24 shows excitation spectrum ($\lambda_{em}$=545 nm) of GLGel and emission recorded for RLGel, GLGel and WLGel ($\lambda_{ex}$=345 nm).
Figure 27:
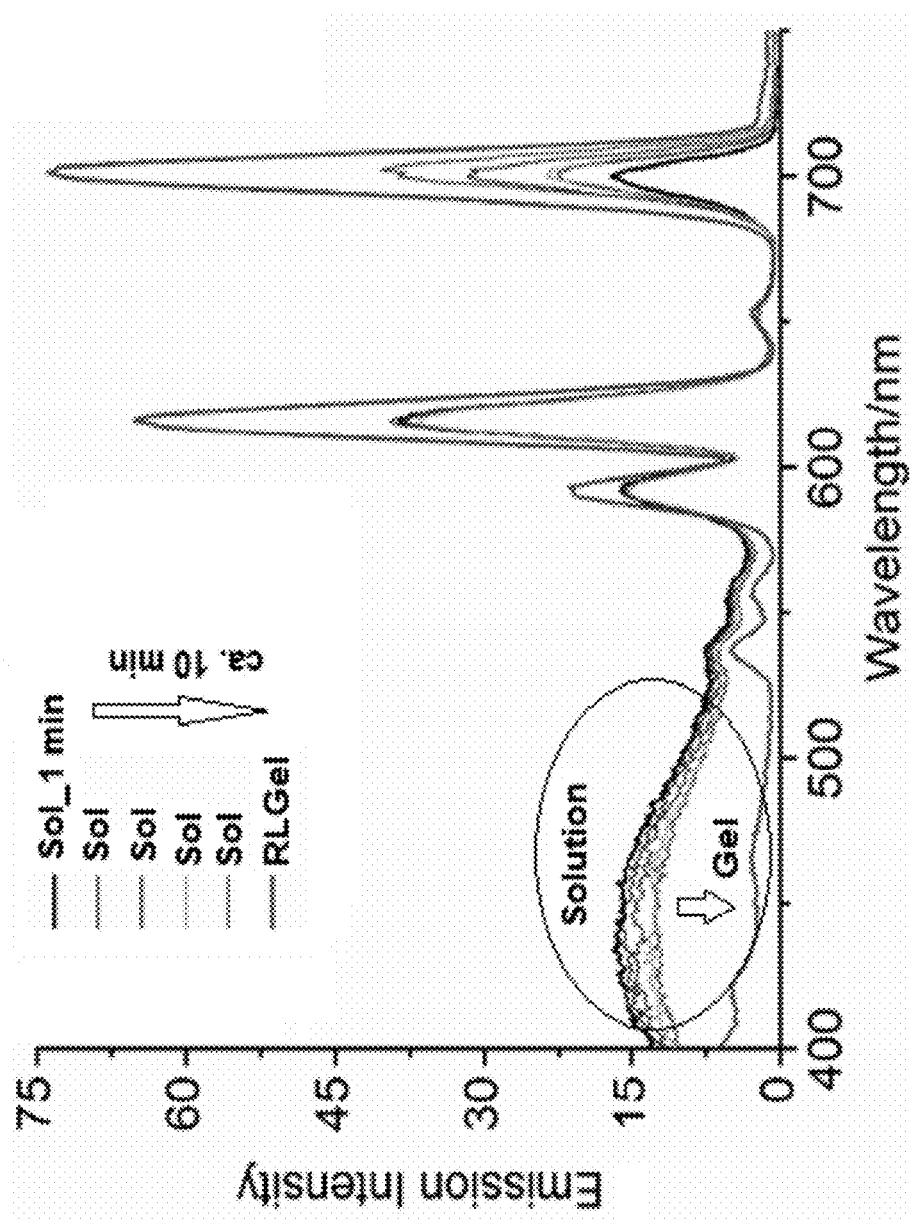
FIG. 27 shows gradual coordination of Eu (III) with polymer 1 by monitoring its time-dependent emission over a time period between the end of mixing (metal ion and free ligand) and gelation (ca. 10 min).

Building upon the previous work on luminescent small molecule based fluids (see, Chen, P.; Holten-Andersen, N. Adv. Optical Mater. 2015, DOI: 10.1002/adom.201400493, which is incorporated by reference in its entirety), the Ln(III)—Terpy coordination complexes was incorporated into polymer networks and incremental addition of $Tb(ClO_4)_3$ to a solution of polymer 1 (both in DMF/$CH_3CN$, 1:1 v/v) up to a ratio of Terpy:Ln=2:1 under gentle shaking gave rise to a transparent green emissive gel (GLGel, $\tau$=0.38 ms, $\Phi$=5.0%, CIE coordinates (0.28, 0.54)) in 2 min (FIGS. 19 and 24). A similar procedure resulted in a red luminescent Eu(III)—coordinated metallogel (RLGel, $\tau$=1.36 ms, $\Phi$=14.8%, CIE coordinates (0.54, 0.32)) but with a slower gelation rate of approximately 10 min (see FIG. 27). Detailed investigations of the coupling between metallogel assembly (and disassembly as described below) and Tb(III)— and Eu(III)—coordination bond dynamics are underway.

Figure 20A:
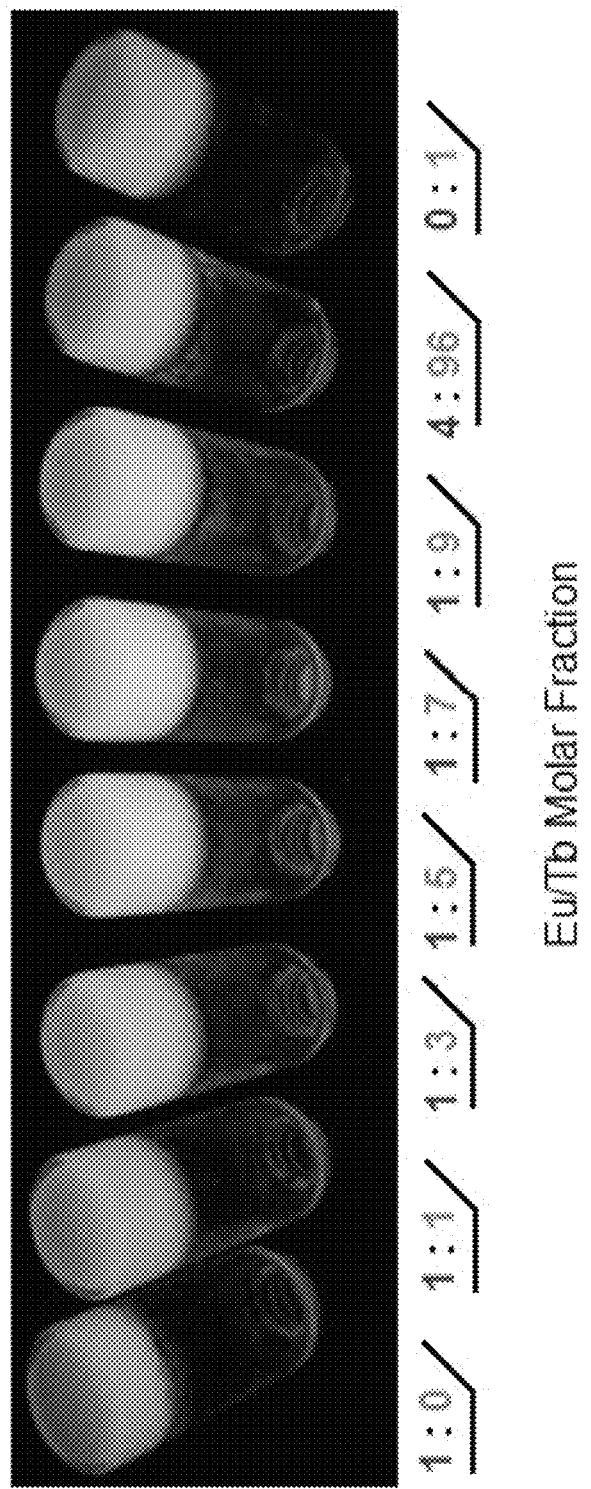
FIGS. 20A-20C show luminescence tuning.
Figures 20B, 20C:
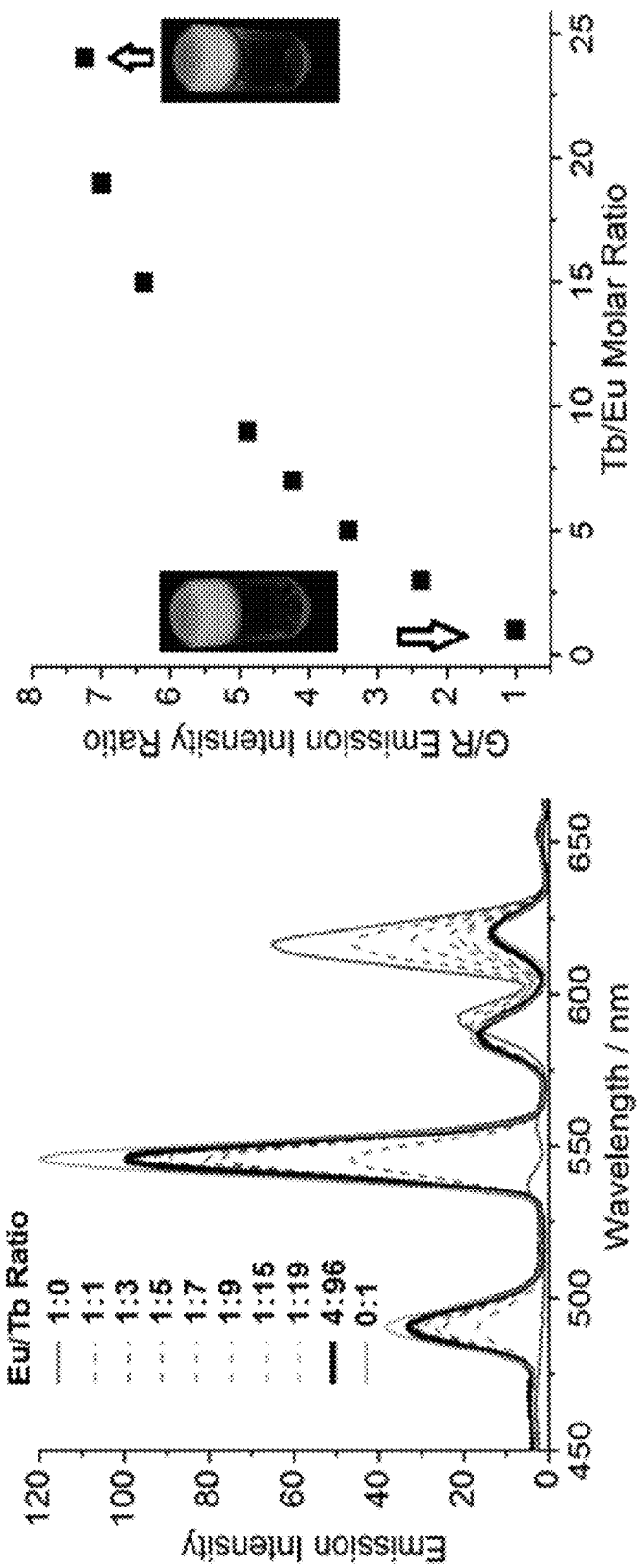
Figure 21A:
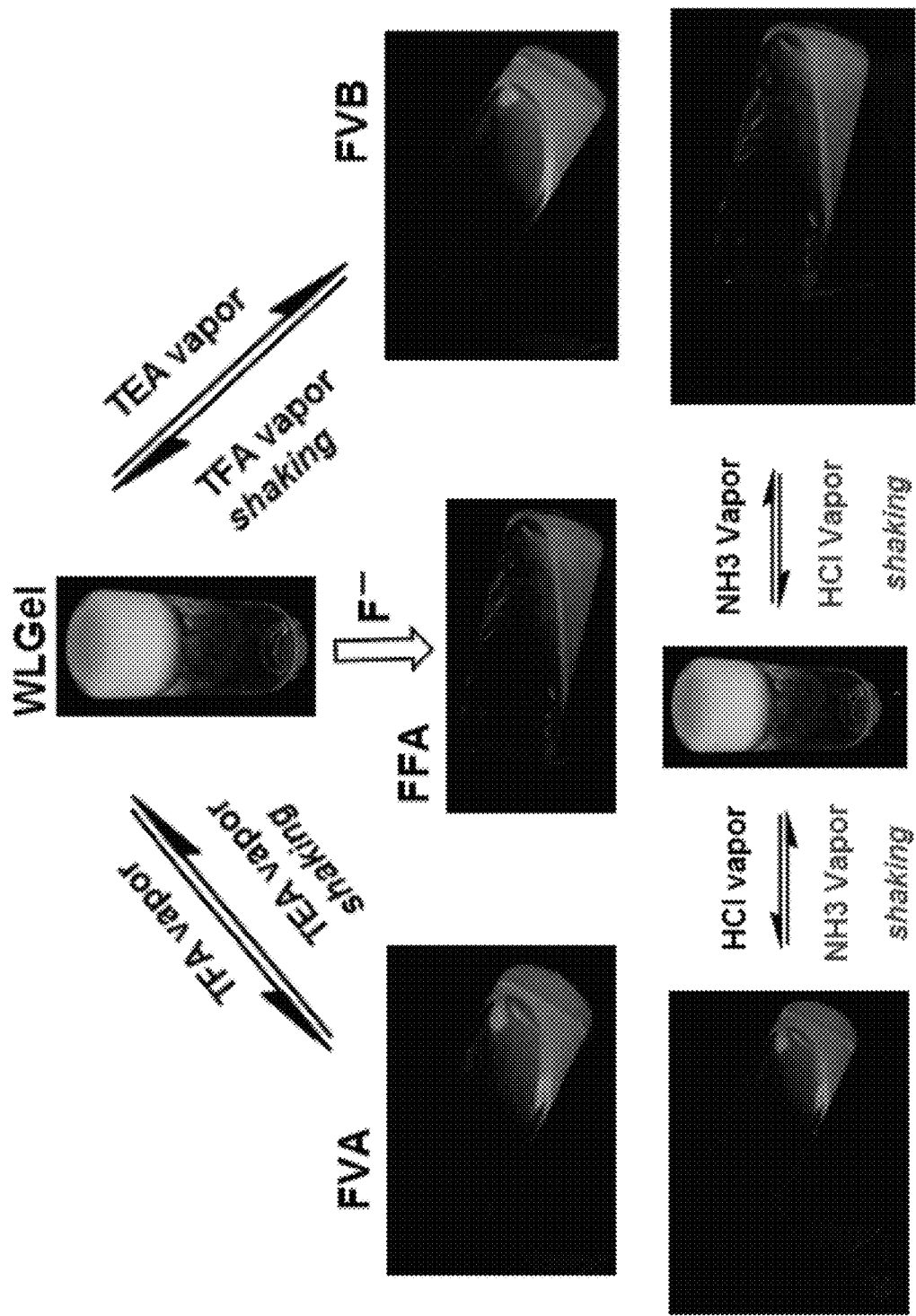
FIGS. 21A-21C show stimuli-responsive emission color change and phase transition of WLGel.
Figure 21C:
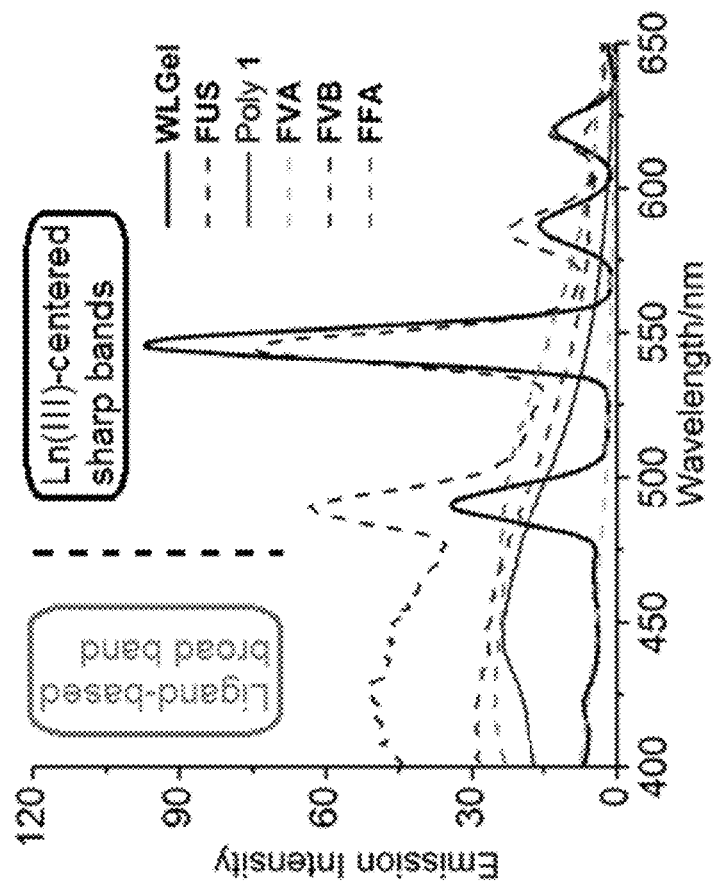
Figure 21B:
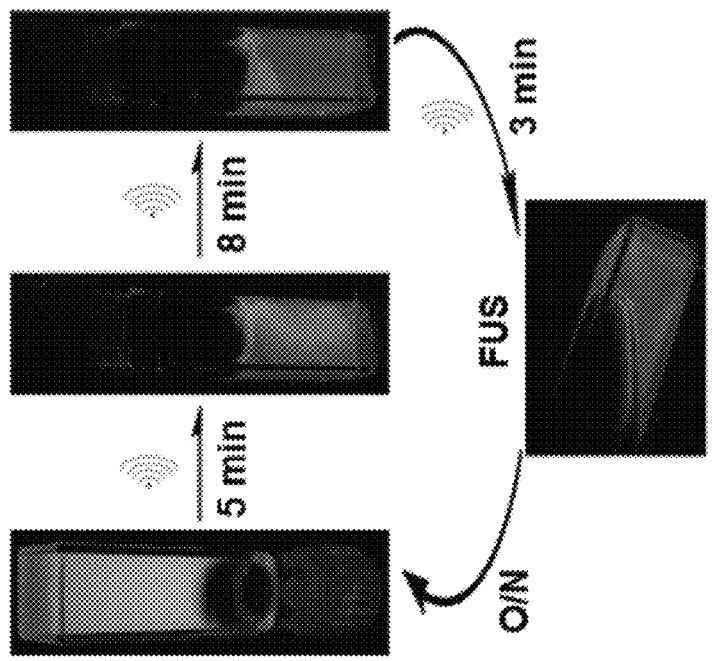
Figure 25A:
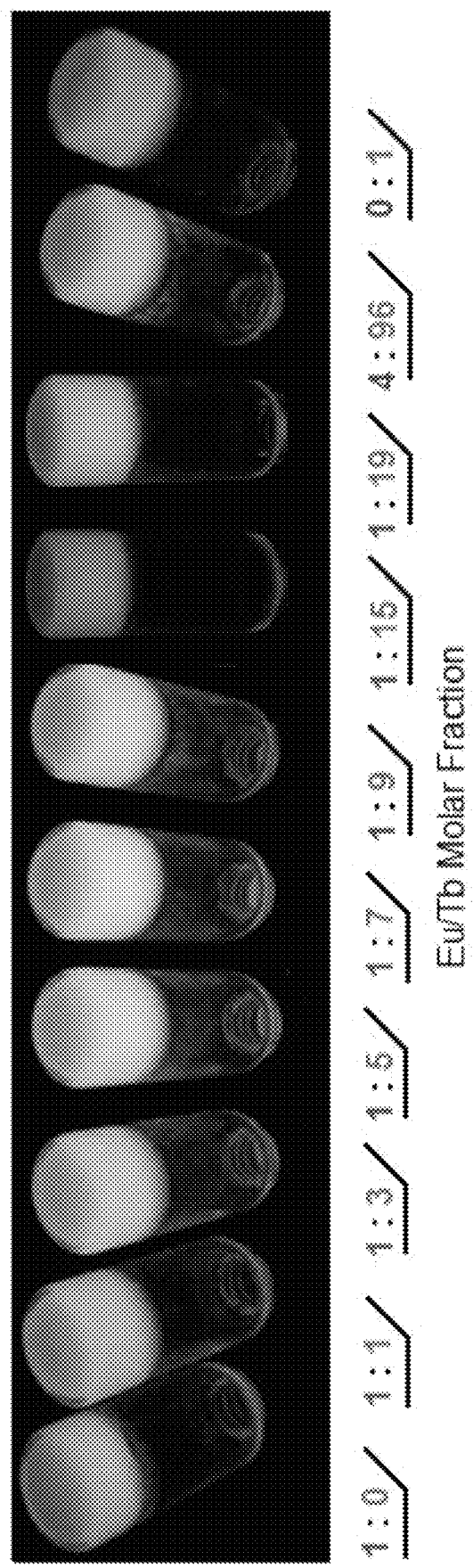
FIGS. 25A and 25B show emission in photographs and as a spectrum.
Figure 25B:
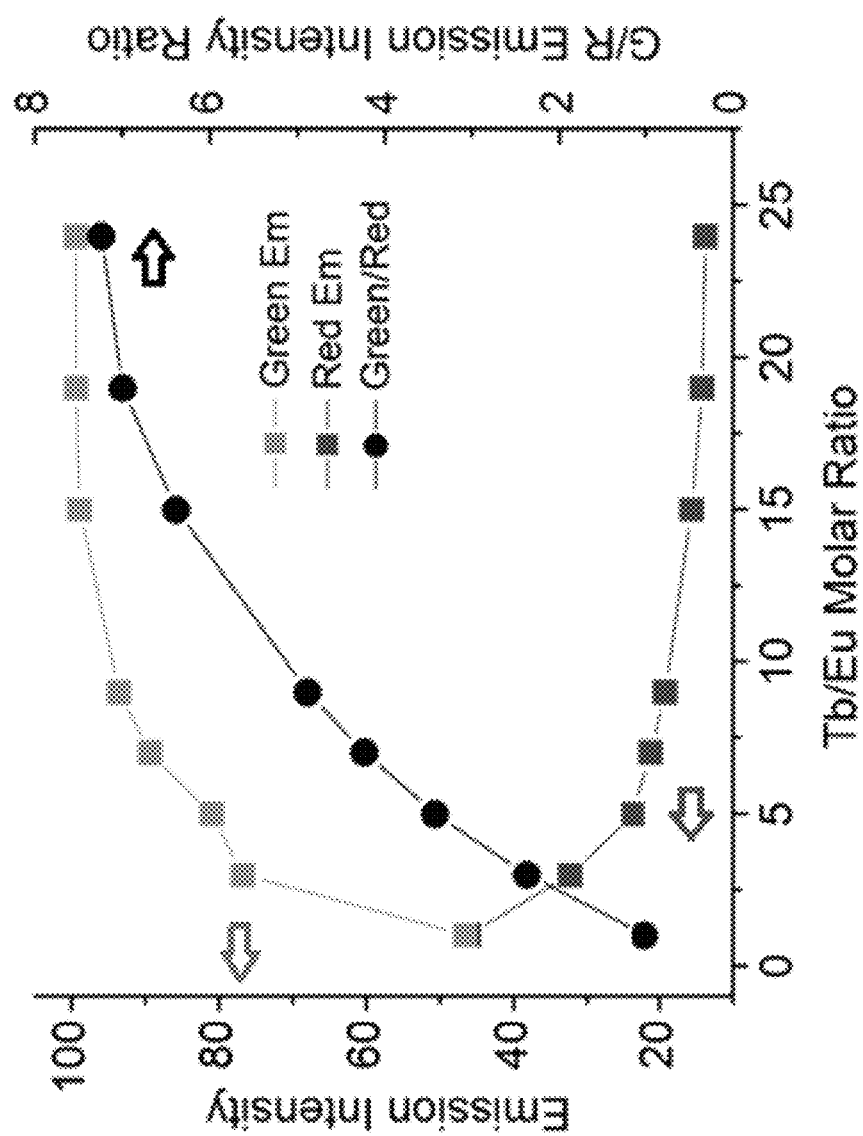
Figure 26A:
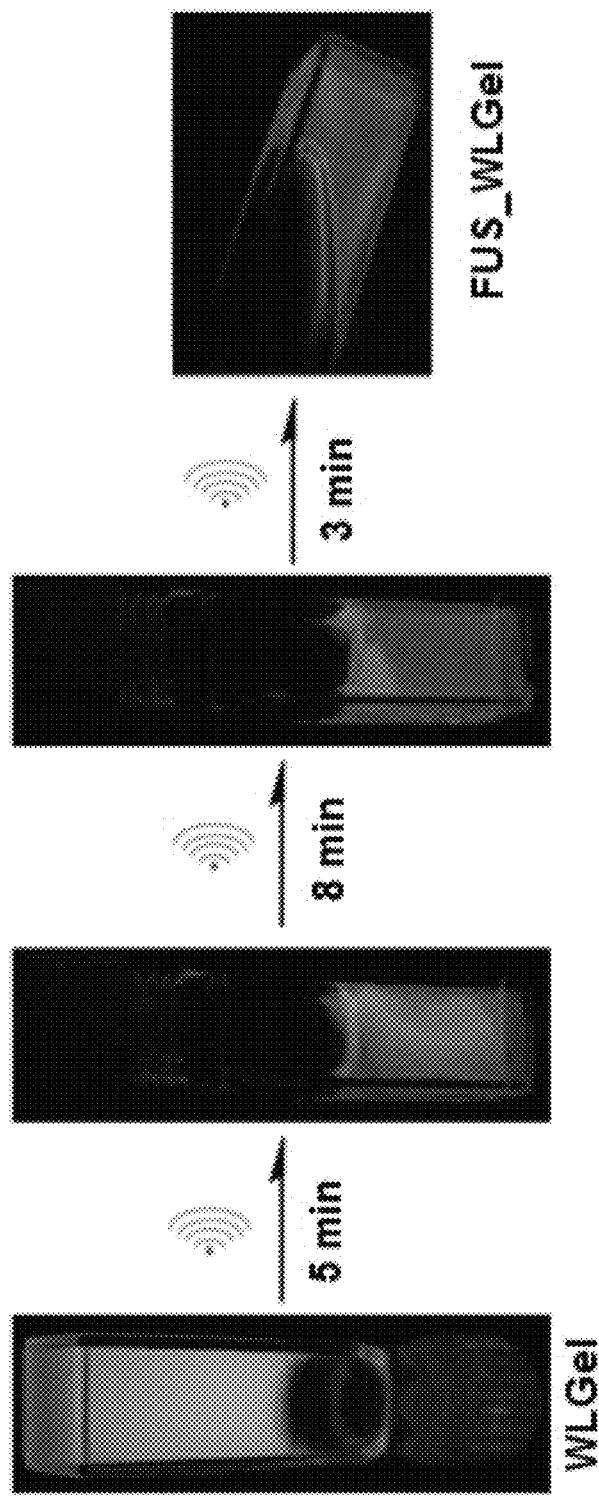
FIGS. 26A-26E show sonication-induced mechanochromism of the WLGel, RLGel and GLGel.
Figure 26B:
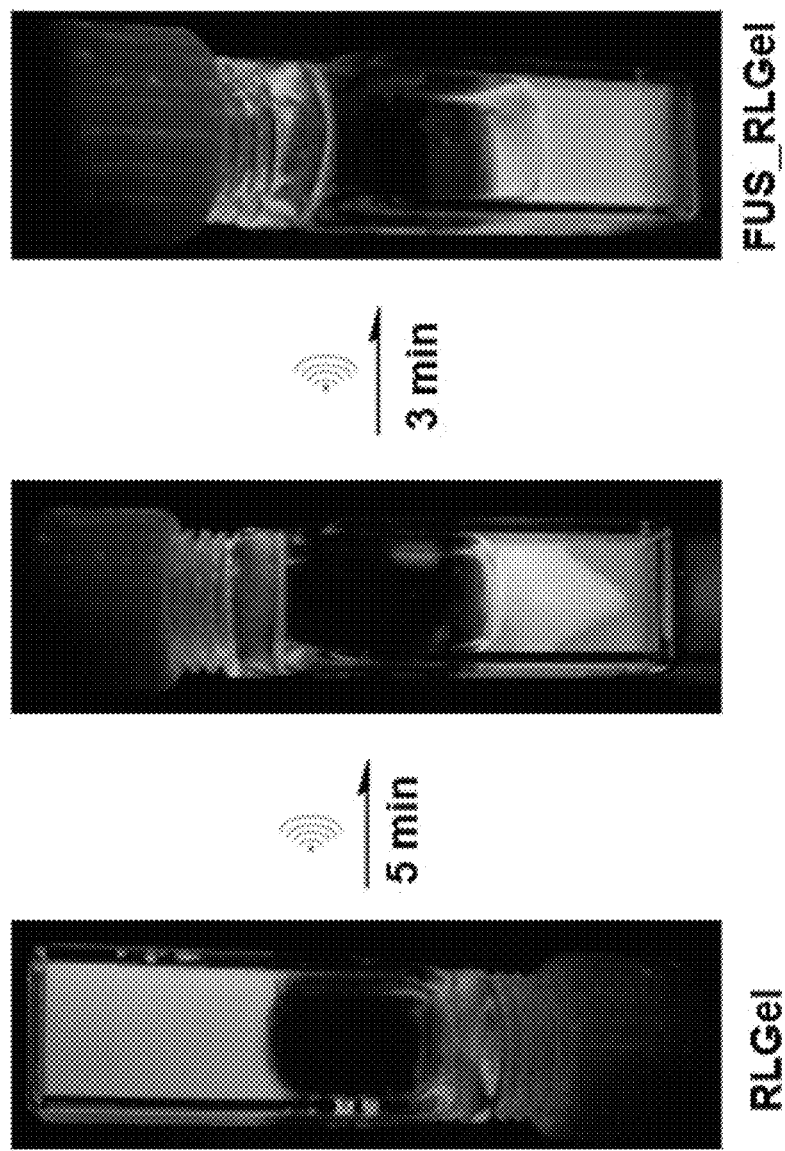
Figure 26C:
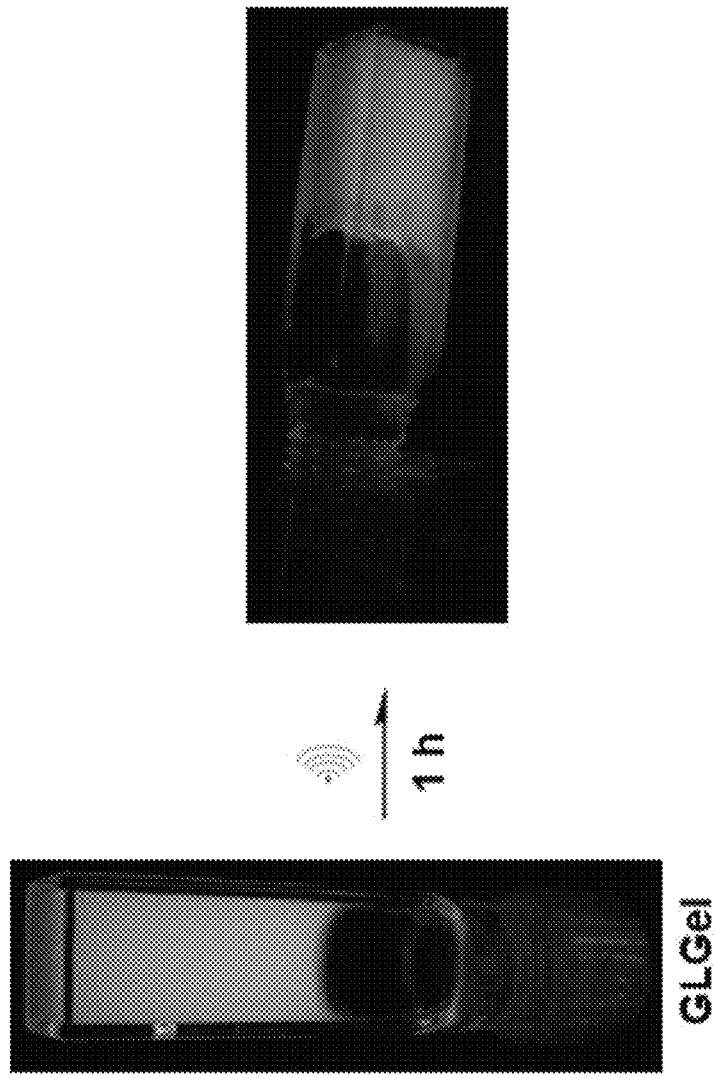
Figure 26D:
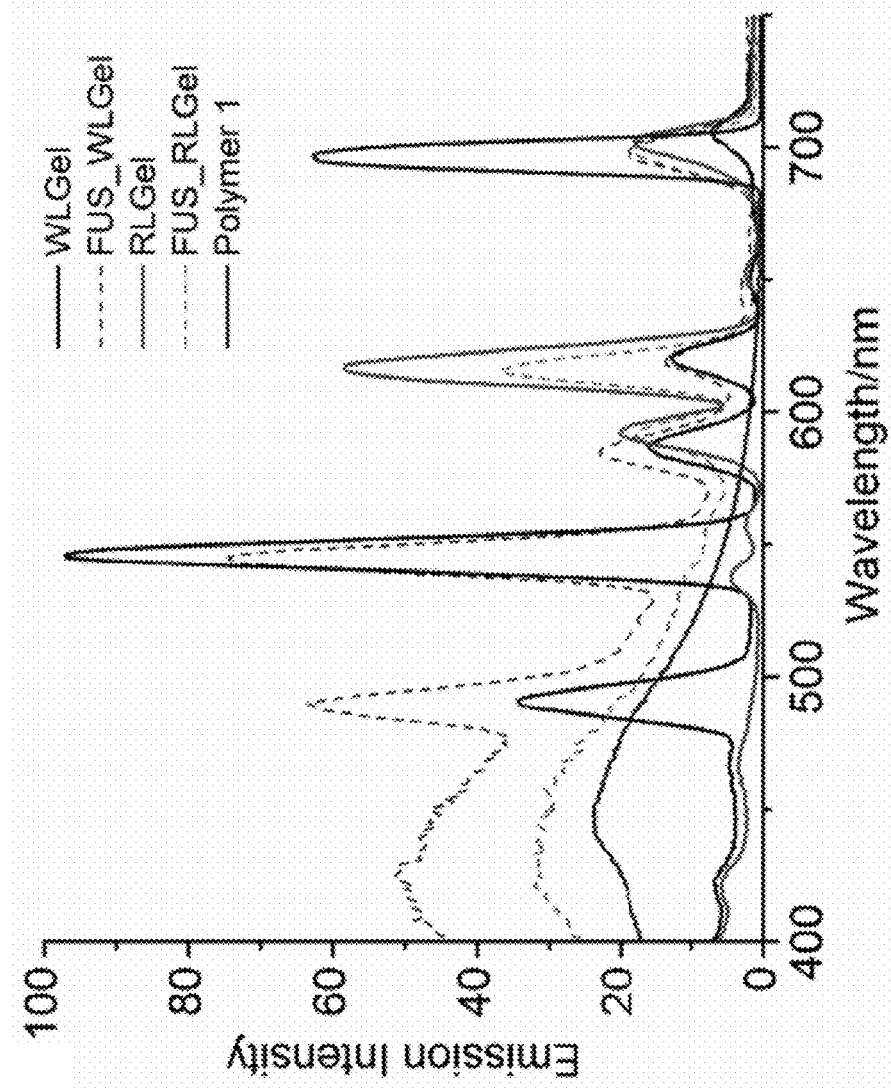
Figure 26E:
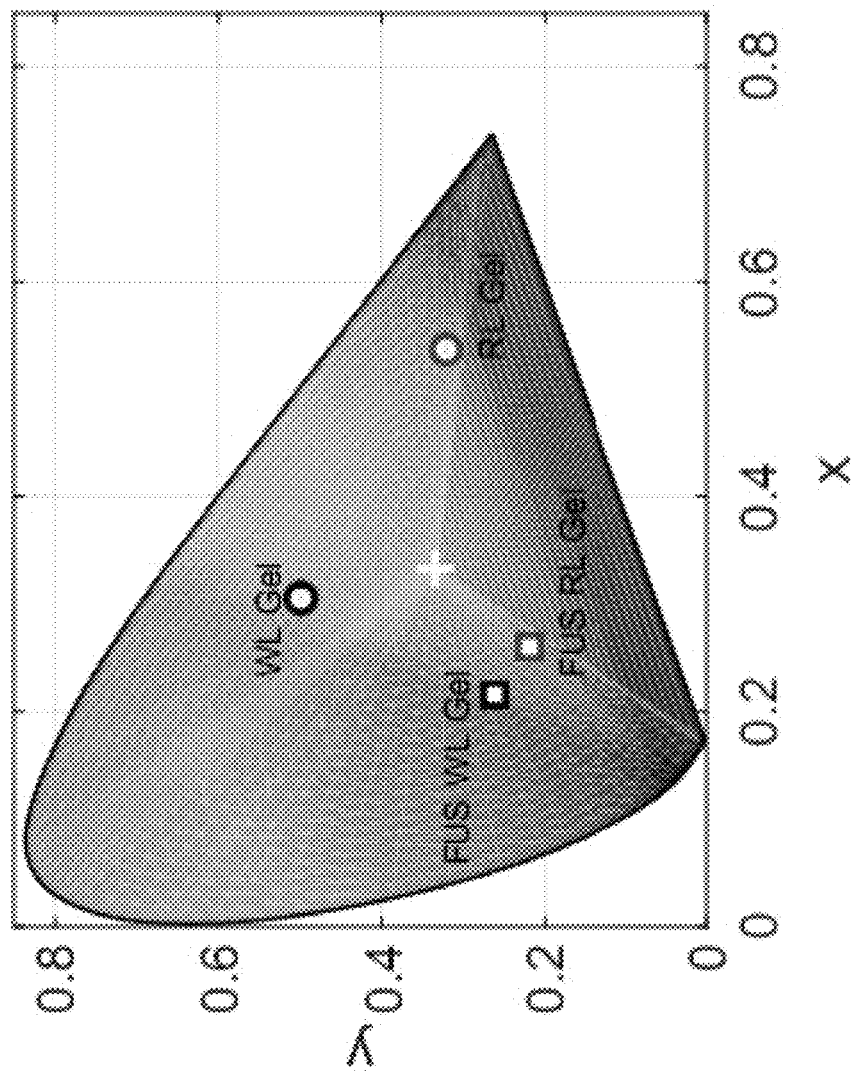

Next how to modulate the metallogel emission was investigated by tuning the stoichiometry of the two lanthanide chromophores (green and red). Titration of the Eu/Tb molar fraction led to a series of soft gels with a broad spectrum of emission including white light under UV irradiation (FIGS. 20A and 25A-25B). Emission spectroscopic studies revealed that the intensity of the green band at 545 nm increased gradually at the expense of the red band at 616 nm as a function of Tb/Eu molar ratio (FIGS. 20B, 20C and 25B). Of particular interest is that an intense white light metallogel (WLGel, with CIE coordinates (0.30, 0.49)) is established at the molar ratio of Eu/Tb=4:96. The straightforward luminescence control demonstrated here offer a simple design approach to broad-spectrum color tuning of light emitting polymer materials. Compared with single-color emissive materials, white luminescent materials offer the potential for more sensitive stimuli-responsive properties given their multi-spectrum chromism. Therefore specifically the stimuli-responsive properties of the white emissive metallogel (WLGel) was characterized. First direct coupling between reversible color changes and sol-gel phase transitions was demonstrated since the Ln-$N_{Terpy}$ bond dynamics dictates not only the emission color but also the gel network stability. As illustrated in FIG. 21A, reversible sol-gel transitions are indeed correlated with color changes when a WLGel is exposed to either the vapor of trifluoroacetic acid (TFA) or triethylamine (TEA). The change in emission spectra across the sol-gel transition confirms the disappearance of the characteristic sharp white emissive bands of the gel phase (see FIG. 21C). Similarly, addition of tetra-n-butylammonium fluoride up to 3 equiv relative to Ln ions also triggered a color change coupled with a sol-gel transition as a consequence of the competing interaction between Ln(III) cations as Lewis acids and fluoride anions ($F^-$) as a Lewis base. The $F^-$ induced WLGel network disassembly is likewise spectroscopically confirmed by emission quenching of the Ln-centered sharp bands (see FIG. 21C), but in contrast to above this gel-sol transition is irreversible due to the generation of $LnF_3$ precipitates (see FIG. 21A).

The dynamic Ln-$N_{Terpy}$ bonds further enabled us to explore the mechano-optically coupled stimuli-responsive properties of the WLGel. A WLGel was exposed to sonication in an ultrasound bath at 25° C. and upon sonication for 5 min a gel-sol transition was observed by a gradual breakdown of the WLGel accompanied by generation of fluid phase (FIGS. 21B and 26A-26E). In contrast to the white luminescence of the remaining gel, the fluid is observed to emit blue light. Continued sonication of the WLGel/fluid mixture leads to complete phase transition into a blue fluid (FUS) with CIE coordinates (0.21, 0.26). Similar to the chemically induced gel-sol transitions described above the mechanically induced fluid reveals a new broad emission band around 430 nm similar to the blue emission of the "free" polymer 1 observed in FIG. 19A (see FIG. 21C). However, in contrast to emission changes observed upon chemically induced gel-sol transitions (FVA, FVB and FFA spectra in FIG. 21C), the sharp emission bands of the WLGel was observed to partially remain in the FUS fluid state, indicative of incomplete cleavage of all M-L crosslinks in the polymer network. Gel reformation of FUS occurred overnight at room temperature with no external triggers. See FIGS. 26A-26E for comparative studies of single metal RLGel and GLGel. Red light metallogel can easily undergo mechanochromisms along with gel-sol phase change while no significant changes were found in the green gel. The emission contrast between the original RLGel and sonication-induced fluid follows a similar trend to the WLGel.

Figure 22A:
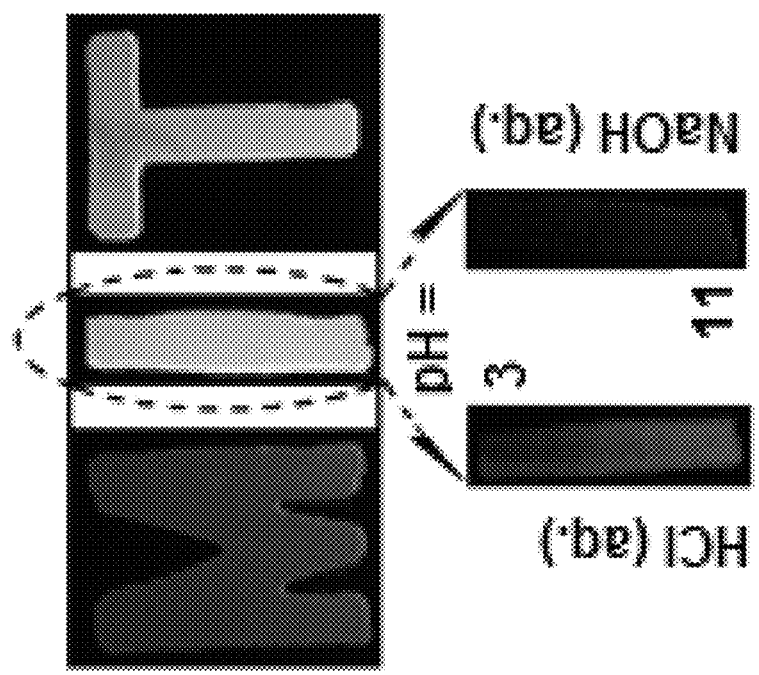
FIGS. 22A-22C show various coatings.
Figure 22B:
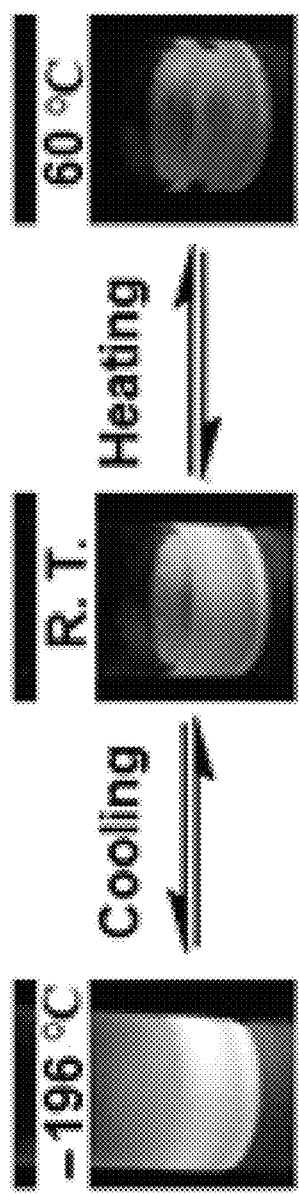
Figure 22C:
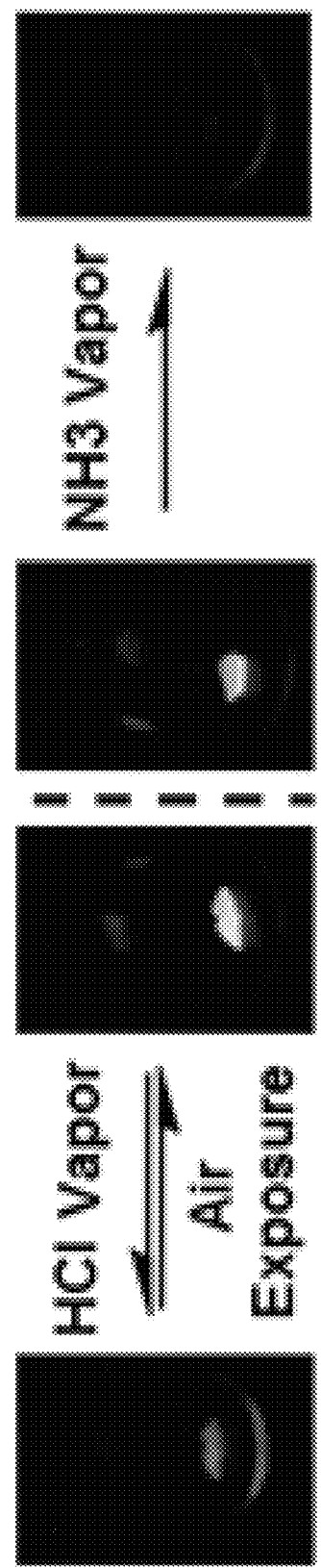
Figure 28:
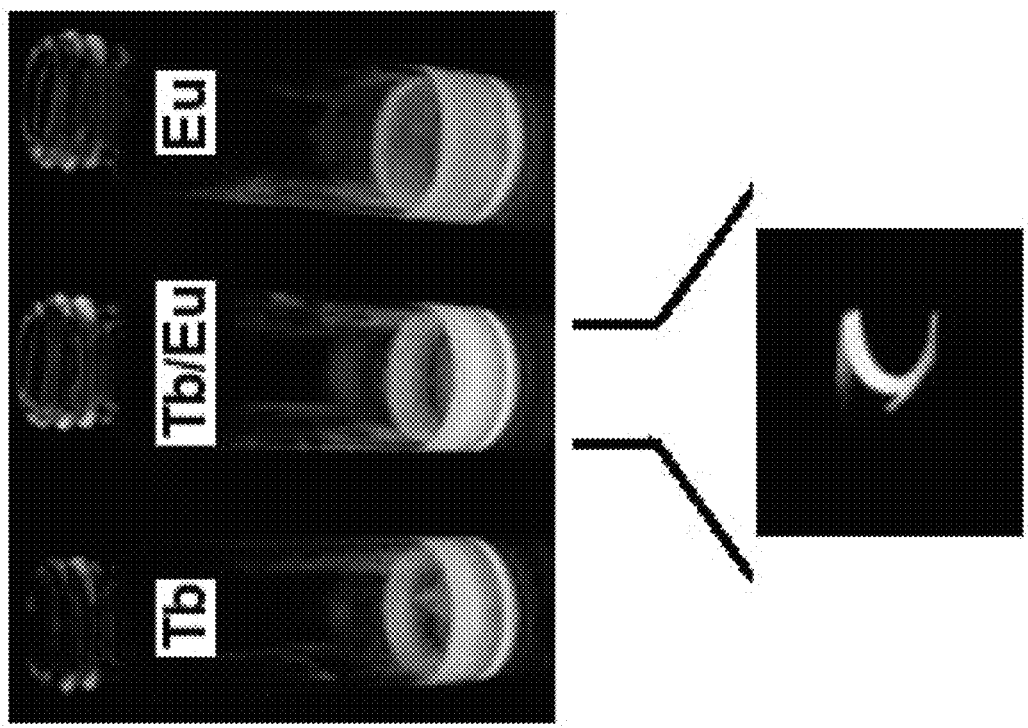
FIG. 28 shows photographs of the solvent-evaporated luminescent metallopolymers in the solid state and the bendable film of white light materials.

To further investigate potential applications of light emitting metallopolymers as stimuli-responsive materials, the thermo- and vapochromisms of solid state films were generated via solvent-evaporation from solutions in MeOH. The mechanically robust films likewise proved to be highly luminescent with red emission for Eu—, green for Tb—, and white for Eu/Tb-coordinated hybrid metallopolymers (Eu/Tb=4:96) (FIG. 28). Furthermore, the white luminescent solid state network was found to reversibly change colors from green over white to red when cycling the temperature between −196° C. (frozen in liquid $N_2$) and 60° C. (FIG. 22B). This distinctive green to red thermochromism strongly suggests intrinsic energy transfer from Tb— to Eu-centered luminescent chromophores with increasing temperature. See, Ananias, D.; Almeida Paz, F. A.; Yufit, D. S.; Carlos, L. D.; Rocha, J. *J. Am. Chem. Soc.* 2015, 137, 3051, and Praveen, V. K.; Ranjith, C.; Armaroli, N. *Angew. Chem. Int. Ed.* 2014, 53, 365, each of which is incorporated by reference in its entirety. Finally red, green or white emissive dip coatings could easily be generated from polymer 1 solutions mixed with Eu, Tb or Eu/Tb at 4:96, respectively (FIG. 22A). The white luminescent coatings (FIG. 22A) and films (FIG. 22C) proved stimuli-responsive to changing pH conditions as well: 1) change to blue emission upon exposure to HCl (aq.) and HCl vapor due to the protonation of $N_{Terpy}$ and subsequent cleavage of Ln(III)—N coordination and 2) white light emission quenching upon exposure to NaOH (aq.) and ammonia ($NH_3$) vapor as a consequence of the hydrolysis of Ln(III) ions (FIG. 22C).

In conclusion, a model design strategy for the preparation of light emitting polymer metallogels crosslinked via Ln M-L interactions is disclosed. The luminescence tuning enabled by Ln M-L coordination bonding demonstrates a simple approach to engineering full spectrum light emission of polymer gels, coatings or films. Furthermore, by taking advantage of the dynamic nature of Ln(III)—N coordination bonds, eversible stimuli-responsive properties were demonstrated including mechano-, vapo-, thermo- and chemochromism of the same set of materials (polymer gels, coatings and films). Given the reversible multi-stimuli responsive behavior of the simple model materials presented here, further study of the dynamic Ln M-L coordinate polymer concept will offer unique possibilities for development of for example smart coatings or paints that allow real-time monitoring of environmental physical-chemical conditions in solvent or gas phase. Finally, the opto-mechanically coupled reversible gel-sol transitions demonstrated here provides early evidence that Ln M-L coordination bonding may function as in situ dynamic mechanophores that not only report local mechanical stimulus but also post-failure self-healing.

EXAMPLES

Materials and General Methods

Tetrabutylammonium cyanide (TBACN), tetrabutylammonium, fluoride (TBAF, 1.0 M in THF), tetrabutylammonium bromide (TBABr), tetrabutylammonium iodide, (TBAI), $LaCl_3·7H_2O$, $EuCl_3·6H_2O$, $TbCl_3·6H_2O$ and 4'-(4-Methylphenyl)-2,2':6',2''-Terpyridine were purchased from Aldrich, 2,2':6',2''-Terpyridine and 4'-chloro-2,2':6',2''-Terpyridine from Alfa Aesar.

Tetrabutylammonium fluoride (TBAF, 1.0 M in THF), 6-Amino-1-hexanol, Triethylamine, anhydrous DMF and $CH_3CN$ were purchased from Aldrich, $Eu(ClO_4)_3·6H_2O$, $Tb(ClO_4)_3·6H_2O$ and 4'-chloro-2,2':6',2''-Terpyridine from Alfa Aesar, 4-Arm PEG Succinimidyl NHS ester (4-Arm PEG-GAS, $M_w$=5269 Da by MALDI-MS, 96.7% substitution of NHS by NMR) from Creative PEGWorks. 6-(2,2':6',2''-Terpyridine-4'-yloxy)-hexylamine and 4-Arm-PEG polymer were prepared using the similar procedures previously described. See, Aamer, K. A.; Tew, G. N. *Macromolecules* 2004, 37, 1990-1993, and Shunmugam, R.; Tew, G. N. *J. Am. Chem. Soc.* 2005, 127, 13567-13572, each of which is incorporated by reference in its entirety.

The fluorescence data were acquired on a Varian Cary Eclipse fluorescence spectrophotometer. For anion titration experiment, fluoride ion stock solution was prepared by diluting the desired amount of TBAF solution (1.0 M in THF) in $H_2O$/DMF (6:4, v/v); stock solutions of the samples were prepared in deionized $H_2O$ and DMF mixtures. Fluoride was added to the sample solution through a microsyringe (±0.1 µ/L).

DFT calculations were performed with the Gaussian03 program. Geometries and electronic properties were calculated by means of hybrid density functional B3LYP with the basis set of 6-31G(d). The input files and orbital representations were generated with Gaussview 3.07 (scaling radii of 75%, isovalue of 0.02).

400 MHz $^1H$ NMR spectra were recorded on a Bruker AVANCE-400 NMR spectrometer equipped with a Magnex Scientific superconducting magnet and auto-tunable, autoshimmable probes. Solution $^1$H NMR spectra were referenced internally to solvent signals.

The GC/MS measurement was carried out on an Agilent 5973N Gas Chromatograph/Mass Spectrometer. The MALDI-MS measurement was performed on a Bruker Omniflex MALDI-TOF instrument with a reflection accessory.

The excitation, emission spectra and luminescence lifetime (c) and quantum yield (1) measurements were carried out on a Varian Cary Eclipse fluorescence spectrophotometer. Sonication was performed in the Bransonic CPX2800H digital bath at room temperature. 110 W and 40 KHz+/−6%.

Synthetic Procedures

Synthesis of 6-(2,2':6',2"-Terpyridine-4'-yloxy)-hexylamine

To a suspension of KOH (2.70 g, 48 mmol) in anhydrous DMSO (50 mL) was added 6-Amino-1-hexanol (1.17 g, 10 mmol). The suspension was warmed up to 60° C. and stirred for additional 30 min, followed by addition of 4'-chloro-2,2':6',2"-terpyridine (2.68 g, 10 mmol). The reaction mixture was kept stirring for 2 d at the same temperature. The solution was then allowed to cool down to R.T., poured into deionized water (500 mL), stirred and allowed to precipitate overnight. The product was filtered off and dried up under high vacuum to give 2 as a pale yellow solid (2.90 g, 83.3%). $^1$H NMR (400 MHz, CDCl$_3$): δ 1.47-1.86 (m, 8H), 2.74 (t, J=6.5 Hz, 2H, NCH$_2$), 4.22 (t, J=6.5 Hz, 2H, OCH$_2$), 7.34 (dd, J=2.0 Hz, 5.0 Hz, 2H, H$_{5,5''(terpy)}$), 7.84 (td, J=2.0 Hz, 7.5 Hz, 2H, H$_{4,4''(terpy)}$), 8.03 (s, 2H, H$_{3',5'(terpy)}$), 8.67 (d, J=8.5 Hz, 2H, H$_{3,3''terpy}$)), 8.70 (d, J=5.0 Hz, 2H, H$_{6,6''(terpy)}$). GC-MS: m/z 348 (100%) (M$^+$).

Synthesis of 4-Arm-PEG Polymer.

To a 25 mL Schlenk flask was added 4-Arm PEG Succinimidyl NHS ester (3.00 g, 0.57 mmol) and compound 2 (1.20 g, 3.42 mmol) at a molar ratio of 1:6. Under N$_2$ protection, anhydrous DMSO (8 mL) was injected by syringe and the reaction mixture stirred to give a clear solution, followed by addition of triethylamine (TEA) (300 μL). The flask was then warmed up to 60° C. and kept stirring for 4 h. The 4-Arm-PEG polymer ligand, 1, was purified by repetitive precipitation from acetone (400 mL×1) and diethyl ester (800 mL×3) and then dried under high vacuum (3.43 g, 97%). MALDI-MS (pos.) m/z: calcd. 6202. found 6202.

General Procedures for Synthesis of Ln(III)—Coordinate Metallogels.

Solutions of 4-Arm-PEG polymer 1 in 0.25 mL of DMF/CH$_3$CN (1:1, v/v) were gently warmed up to accelerate their dissolution and then cooled back down to R.T. To these individual solutions were added dropwise Ln(ClO$_4$)$_3$ stock solutions with different Eu/Tb molar ratios in 0.25 mL of DMF/CH$_3$CN (1:1, v/v), leading to gelation in 2 to 10 min dependent on metal composition. For the emission measurement in cuvettes (2 mL), all reagents were scaled up to the 4-fold amounts. Coordination of Ln(III) with Terpy group was controlled to reach a 1:2 mode.

Other embodiments are within the scope of the following claims.

What is claimed is:

1. A coating including a composition comprising:
a light-emitting metallogel including a composition of a red, green and blue light emitting metal-coordination complex including-a lanthanide metal ion ligand-lanthanide functionalized polymer, wherein the coating emits white light and undergoes a color change upon exposure to a stimulus including a chemical stimulus and wherein the ligand includes a terpyridine (Tpy).

2. The coating of claim 1, wherein the polymer includes poly(ethylene glycol).

3. The coating of claim 1, wherein the stimulus includes a solvent.

4. The coating of claim 1, wherein the stimulus includes a temperature change.

5. The coating of claim 1, wherein the stimulus includes a pH change.

6. The coating of claim 1, wherein the stimulus includes anion competition.

7. The coating of claim 1, wherein the lanthanide includes a plurality of lanthanides.

8. The coating of claim 1, wherein the stimulus includes a mechanical stimulus.

9. The coating of claim 1, the lanthanide complex includes europium (Eu).

10. The coating of claim 9, the lanthanide complex further includes terbium (Tb).

11. The coating of claim 10, wherein the ratio of Eu:Tb is 4.96:1.

12. The coating of claim 1, the color change is reversible.

* * * * *